United States Patent [19]

Kawamura et al.

[11] Patent Number: 4,991,114
[45] Date of Patent: Feb. 5, 1991

[54] PRINTER COMPRISING DISPLAY MEANS FOR DISPLAYING OPERATION STATE THEREOF

[75] Inventors: Motomi Kawamura; Yukio Tadauchi; Yoshikazu Ikenoue; Takashi Morikawa; Ikunori Yamaguchi, all of Osaka, Japan

[73] Assignee: Minolta Camera Kabushiki Kaisha, Osaka, Japan

[21] Appl. No.: 442,640

[22] Filed: Nov. 29, 1989

[30] Foreign Application Priority Data

Nov. 30, 1988 [JP] Japan .................. 63-304828

[51] Int. Cl.⁵ .................................. G06K 15/00
[52] U.S. Cl. .......................... 364/519; 364/200; 364/900
[58] Field of Search ........ 364/519, 520, 235 MS File, 364/900 MS File; 346/154

[56] References Cited

U.S. PATENT DOCUMENTS

| | | | |
|---|---|---|---|
| 3,976,975 | 8/1976 | Cochran | 364/900 |
| 4,440,487 | 4/1984 | Miura | 364/519 |
| 4,891,769 | 1/1990 | Tasaki | 364/519 |

Primary Examiner—Arthur G. Evans
Attorney, Agent, or Firm—Burns, Doane, Swecker & Mathis

[57] ABSTRACT

A printer for printing data received from an external data processor is disclosed. Image data are developed responsive to the received data, and the developed image data are printed on printing paper. The printer comprises an indicator for indicating the operation state thereof. The indicator is driven so as to flicker when receiving data, and is driven so as to light when converting data into image data.

10 Claims, 23 Drawing Sheets

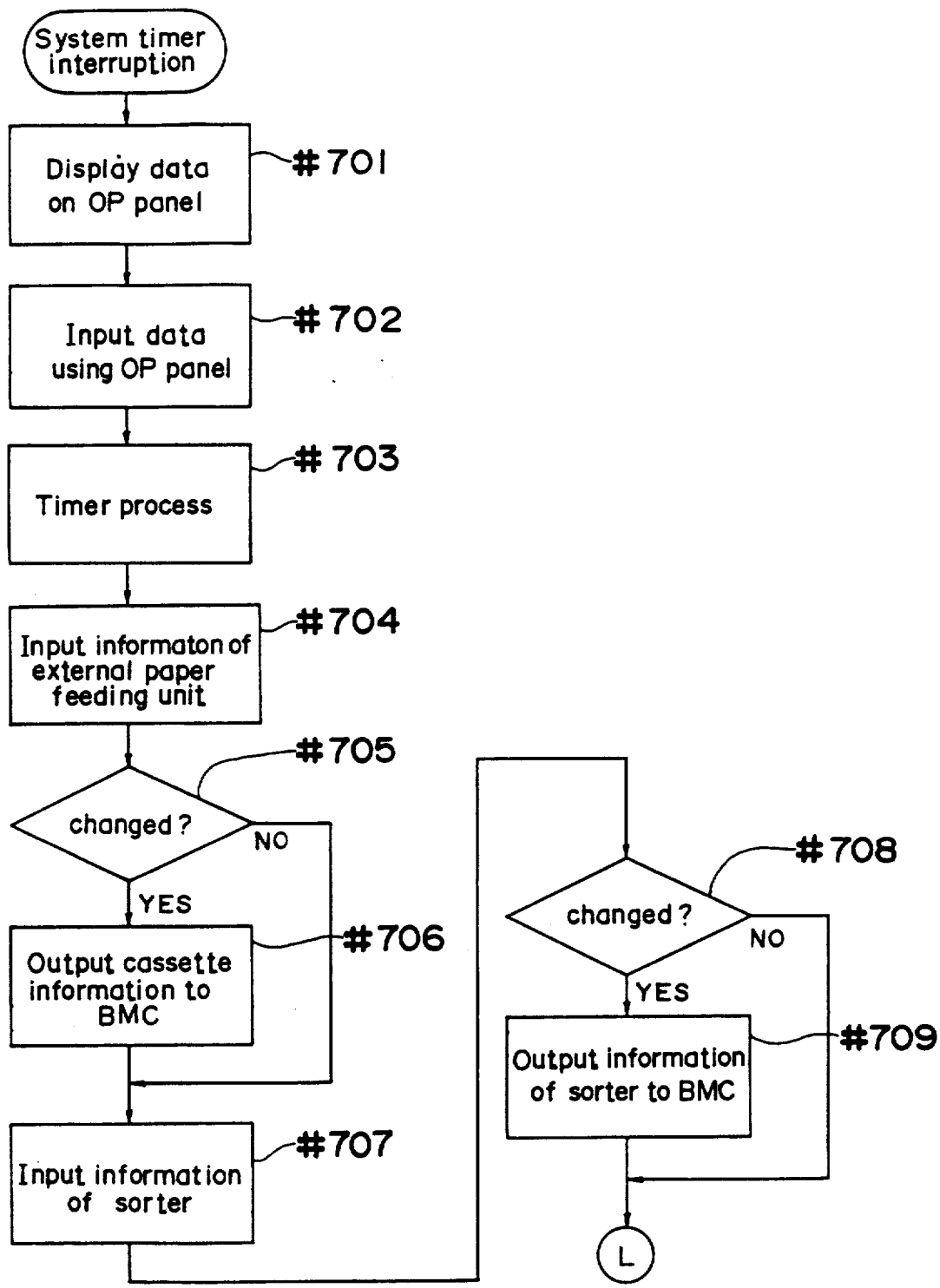

PRINTER COMPRISING DISPLAY MEANS FOR DISPLAYING OPERATION STATE THEREOF

BACKGROUND OF THE INVENTION

1. Field of the Invention

The present invention relates to a printer for printing bit images according to data input from an external data processor such as a host computer, and more particularly, to a printer of this type comprising display means for displaying the operation state thereof in detail.

2. Description of Related Art

In a printer system comprising a printer and a data processor such as a host computer, an image reader, which are connected to each other, the printer processes data sent from the data processor, for example, the printer converts them into dot images or bit map images to be actually printed out according to a font pattern stored in a font memory. After completing the data process of, for example, one page, the printer starts to print the converted images on a sheet of printing paper.

On an operation panel of the printer, generally, there is provided a lamp for indicating a state of data process, for example, such a state that the data are being received from the external data processor, in addition to a lamp for indicating that the printer is in a waiting state for the printing operation. If the operator can confirm that the data are being received from the external data processor, he may feel easy. Furthermore, after all the data have been received therefrom, the operator may wish to set the data processor in an off-line state so as to use another function of the data processor, or he may wish to turn off the printer system. In those cases, the operator can enter a proper instruction to the printer system by judging the state of data process according to the lamp provided on the operation panel.

On the other hand, in the printer, various kinds of processes are executed as follows. Upon receiving data sent from the external data processor, for example, data having a relatively short length may be received at a relatively long time interval, and a large amount of data composed of many pages may be received. Further, program data of page description language such as post script may be received in addition to character code data and bit image data. Furthermore, in the data process of the printer, there are a character code process for converting character code data into bit image data according to a font pattern stored in the font memory and storing them in a bit map memory, a graphic image process for storing bit image data in the bit map memory, and a page description language process for converting data into graphic image data according to a program of the page description language and storing them in the bit map memory. Respective times required for receiving individual data and respective times required for processing individual data are different from each other over a wide range.

If the operator can not grasp the operation state of the printer such as a data receiving state, a data processing state, a waiting state, he may be anxious about the operation of the printer. For example, he may suppose that he uselessly waits for completion of the data process for a long time after the data process is suspended due to an error. Furthermore, he may judge by mistake that the data process is completed, and thereafter, he may do misoperation.

In a conventional printer, there is provided a lamp which flickers while receiving or processing data and lights until a sheet of printing paper is discharged to a paper discharging tray. In the printer of this type, the operator can not distinguish the data receiving state from the data processing state, and therefore, we can not judge a timing for setting the data processor in the off-line state or a timing for turning off the printer system until the data process is completed.

In another conventional printer, there is provided a lamp which flickers while receiving data, lights out when a trouble is caused therein and lights in the other cases. In the printer of this type, the operator can grasp the data receiving state, however, he can not grasp whether or not the data process is completed until a sheet of printing paper is discharged after printing out.

Therefore, in the printer, there is preferably provided a lamp for indicating the operation state of the printer so that the operator can judge that the printer is operating normally.

SUMMARY OF THE INVENTION

An essential object of the present invention is to provide a printer for printing data received from an external data processor, which is capable of displaying the operation state thereof in detail so that the operator can judge that the printer is operating normally.

Another object of the present invention is to provide a printer for printing data received from an external data processor, which is capable of distinguishably displaying a data receiving state and a data processing state thereof.

In order to accomplish the aforementioned objects, according to one aspect of the present invention, there is provided a printer for printing data received from an external data processor, comprising: receipt means for receiving data sent from said external data processor; storage means for temporarily storing the data received by said receipt means; processing means for developing image data, responsive to the data stored in said storage means; print means for printing the image data developed by said processing means on printing paper; first detection means for detecting that said receipt means is in operation and for outputting a first detection signal when detecting it; second detection means for detecting that said process means is in operation and for outputting a second detection signal when detecting it; first display means for displaying that said receipt means is in operation, responsive to the first detection signal; and second display means for displaying that said processing means is in operation, responsive to the second detection signal.

According to another aspect of the present invention, there is provided a printer for printing data received from an external data processor, comprising: receipt means for receiving data sent from said external data processor; storage means for temporarily storing the data received by said receipt means; processing means for developing image data, responsive to the data stored in said storage means; print means for printing the image data developed by said processing means on printing paper; first detection means for detecting that said receipt means is in operation and for outputting a first detection signal when detecting it; second detection means for detecting that said process means is in operation and for outputting a second detection signal when detecting it; display means for displaying the operation state of said printer; and drive means for driving said display means so as to display in a first display state responsive to the first detection signal, and driving said display means so as to display in a second display state different from the first display state responsive to the second detection signal.

BRIEF DESCRIPTION OF THE DRAWINGS

These and other objects and features of the present invention will become clear from the following description taken in conjunction with the preferred embodiment thereof with reference to the accompanying drawings, in which:

FIGS. 22a and 22b are flowcharts of a system timer interruption process executed by the interface controller shown in FIG. 4.

DETAILED DESCRIPTION OF THE PREFERRED EMBODIMENT

Figure 1:
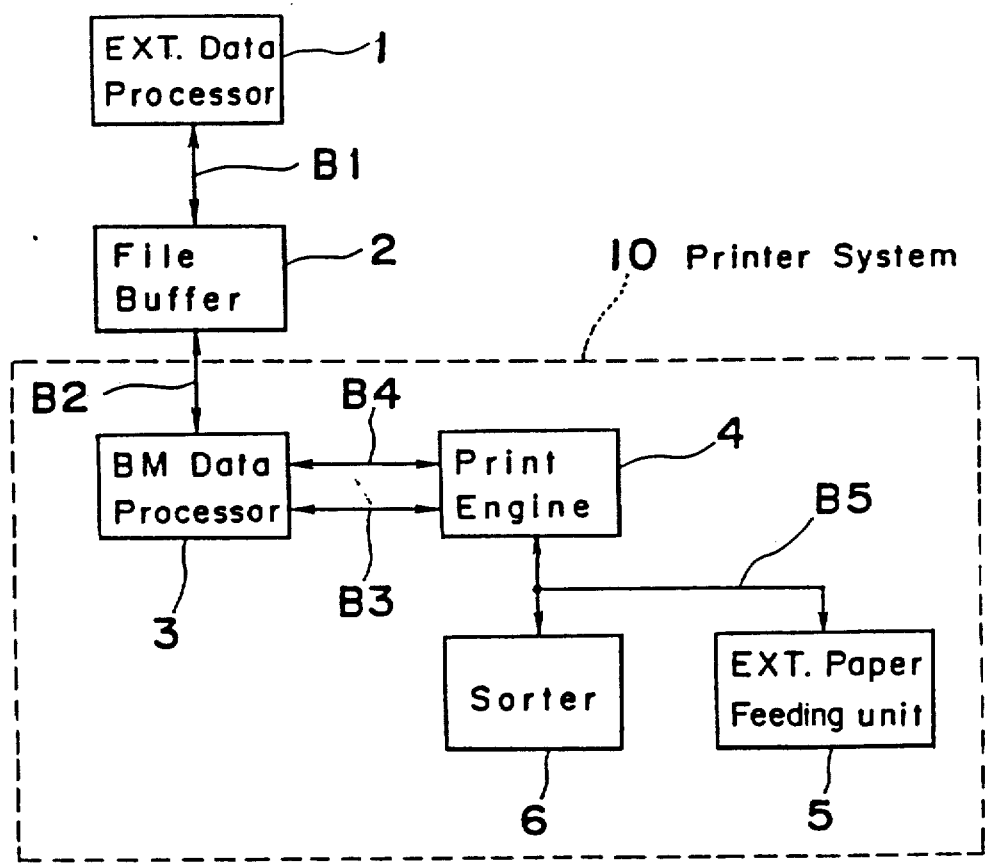
FIG. 1 is a block diagram showing a printer system of the preferred embodiment according to the present invention.

A preferred embodiment according to the present invention will be described below in the order of the following items, with reference to the attached drawings.
 (a) Composition of electrophotographic printer system
 (b) Bit map controller
 (c) Display of operation state of printer system
 (d) Control flow of bit map controller
  (d-1) Control flow of first data processor
  (d-2) Control flow of second data processor
 (e) Control flow of interface controller of print engine (a) Composition of electrophotographic printer system FIG. 1 shows an image forming system including a printer system 10 according to the preferred embodiment of the present invention.

Data outputted from an external data processor 1 such as a host computer are once stored into an external file buffer memory 2 in order to improve the throughput of the external data processor 1, and thereafter, the stored data are outputted from the file buffer memory 2 to the printer system 10.

The printer system 10 includes a bit map type data processor 3, a print engine 4 including a laser and an electrophotographic printer, and accessory apparatuses such as an external paper feeding unit 5, a sorter 6 and the like.

Figure 2:
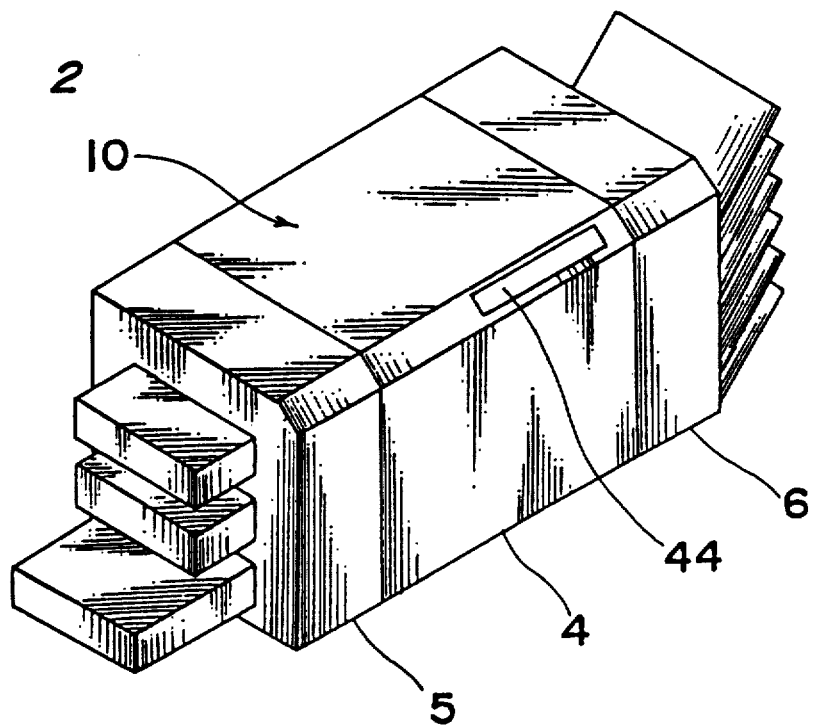
FIG. 2 is a perspective view showing the printer system shown in FIG. 1.

FIG. 2 is a perspective view showing the printer system 10 shown in FIG. 1.

The print engine 4 installs the bit map type data processor 3 therein, and the external paper feeding unit 5 and the sorter 6 are assembled to the print engine 4. On a front edge portion of the upper surface of the main body of the print engine 4, there is provided an operation panel 44 having a display for displaying various indications regarding the printer system and keys for inputting data and commands.

Figure 3:
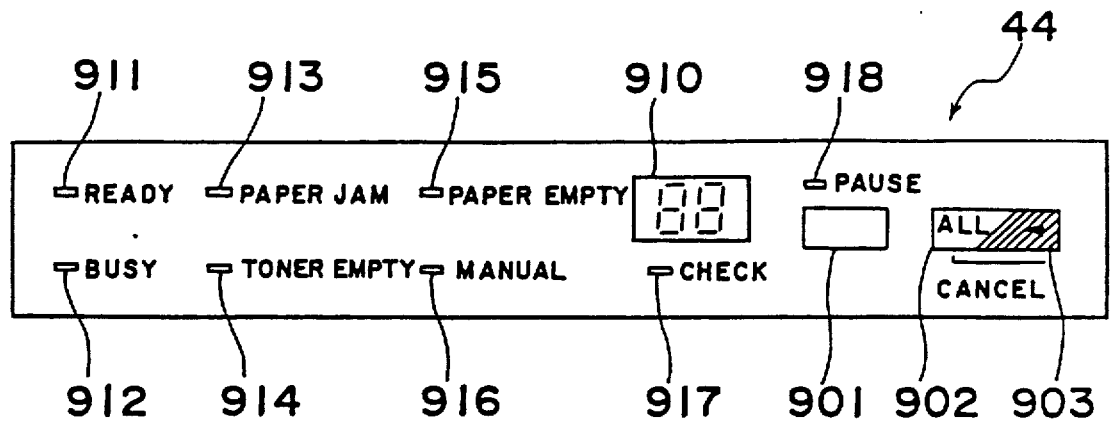
FIG. 3 is a top plan view showing an operation panel of the printer system shown in FIG. 2.

FIG. 3 is a top plan view showing the operation panel 44 shown in FIG. 2.

On the operation panel 44, entry keys 901 to 903 and indicators 910 to 918 are arranged. The key 901 is a PAUSE key for interrupting a printing operation. The key 902 is a TEST key for performing a test printing operation. The key 903 is a SHIFT key, and the SHIFT key 903 becomes a CANCEL key for stopping printing operation when it is pressed together with the TEST key 902. The reason why the CANCEL function becomes effective only when both of keys 902 and 903 are pressed at the same time is to avoid an undesirable cancel by a careless operation.

Furthermore, the indicator 912 of an LED displays the operation state of the printer system 10. As described later, the indicator 912 flickers at a first mode while the printer system 10 receives data outputted from the external data processor 1, it is turned on at a second mode while the printer system 10 processes the data, and it is turned off at a third mode while the printer system 10 is in a waiting state.

Figure 4:
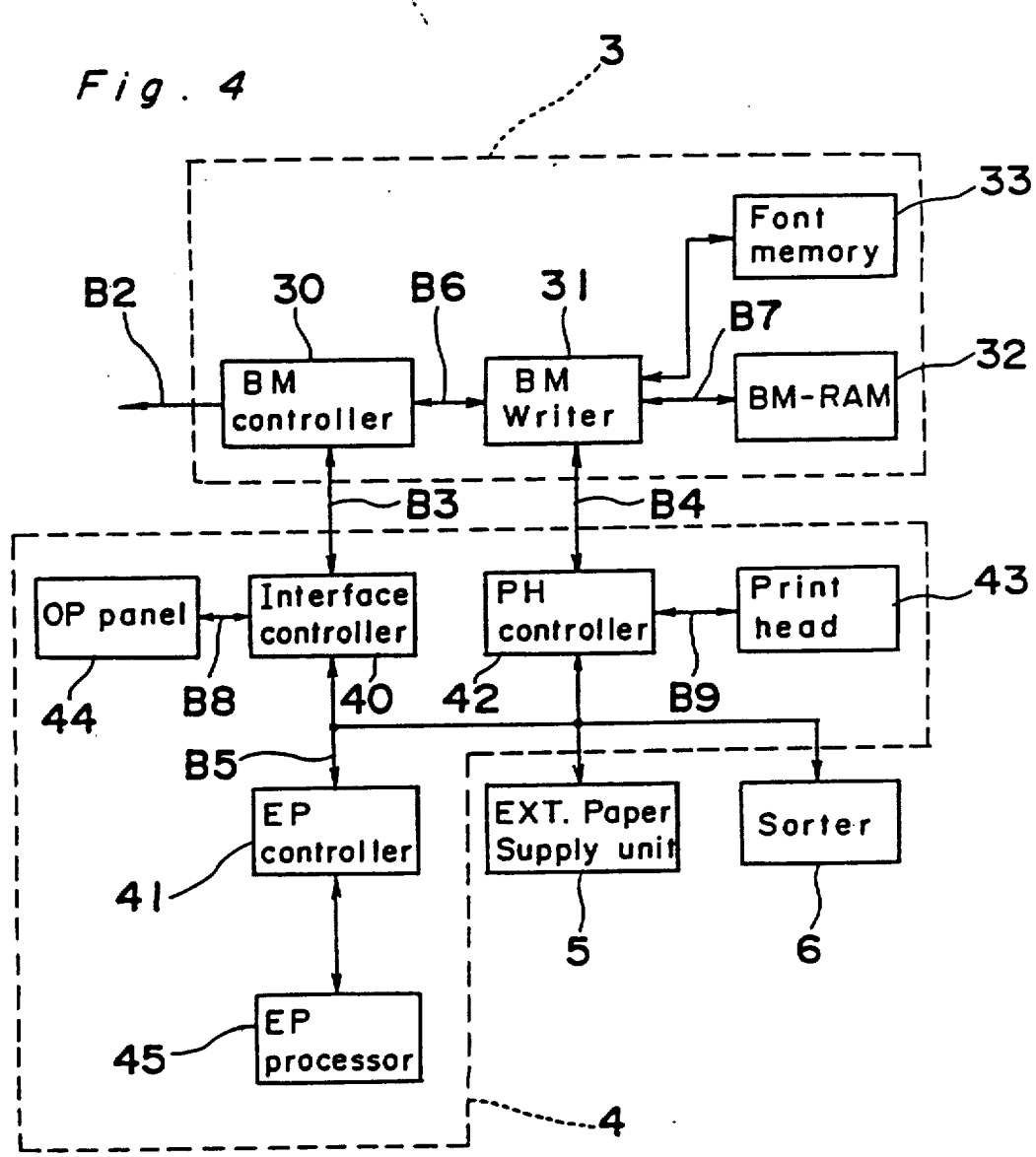
FIG. 4 is a block diagram showing a bit map type data processor and a print engine shown in FIG. 1.

FIG. 4 is a block diagram of the bit map type data processor 3 and the print engine 4 shown in FIG. 1.

The bit map type data processor 3 includes a bit map controller (referred to as a BMC hereinafter) 30, a bit map random access memory (referred to as a BM-RAM hereinafter) 32, a bit map writer (referred to as a BMW hereinafter) 31 shown in FIG. 6 for imaging bit images on the BM-RAM 32, and a font memory 33, which are connected to each other as shown in FIG. 4. The bit map type data processor 3 communicates with the print engine 4, and vice versa, through a bus B3 for control data such as a number of prints, an accessory control signal and the like, and a bus B4 for image data. The operation of the indicator 912 is controlled by the BMC 30.

The print engine 4 further includes an interface controller 40, an electrophotographic process controller 41 and a print head controller (referred to as a PHC hereinafter) 42. The interface controller (referred to as an IFC hereinafter) 40 processes the control data outputted from the BMC 30, controls the operation of the operation panel 44 and controls operation timings of respective controllers of the print engine 4 through an internal bus B5. The electrophotographic process controller 41 controls the operation of an electrophotographic processor 45 according to data sent from the interface controller 40 through the internal bus B5.

The PHC 42 controls the emitting of a semiconductor laser (not shown) and the rotation of a polygon mirror (not shown), both of which are provided in a print head 43, according to information sent from the IFC 40 through the internal bus B5 in order to write image data sent from the BMW 31 through the internal bus B4, on the photoconductive layer 401a of the photoconductor drum 401. Also, the operation of each of the external paper feeding unit 5 and the sorter 6 is controlled through the internal bus B5 by the IFC 40.

(b) Bit map controller

Figure 5:
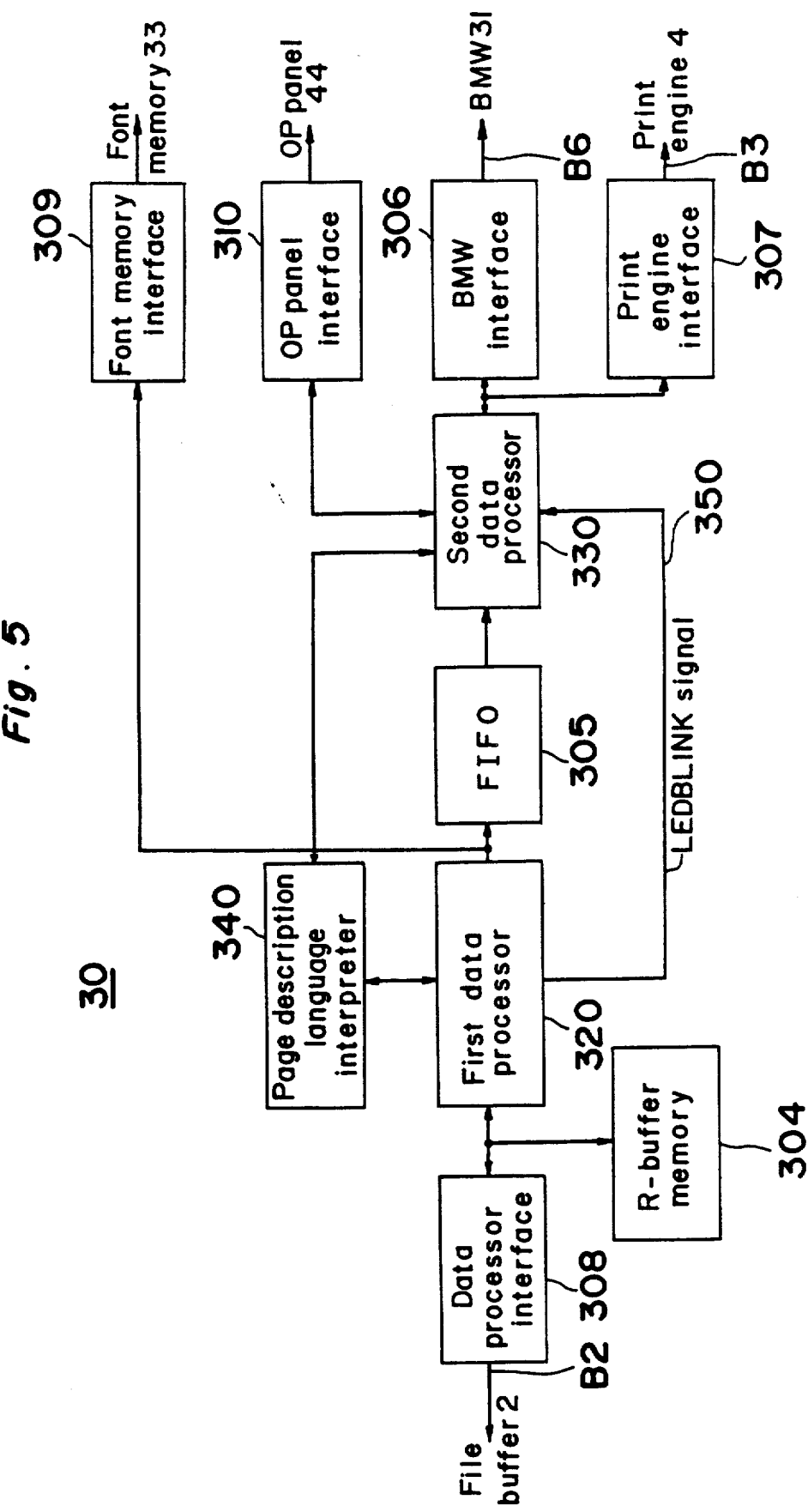
FIG. 5 is a block diagram showing a bit map controller shown in FIG. 4.

FIG. 5 is a block diagram of the BMC 30 shown in FIG. 4.

Referring to FIG. 5, the BMC 30 comprises first and second data processors 320 and 330. Data received from the external data processor 1 through a data processor interface 308 are stored in an R-buffer memory 304 temporarily and are processed by the first data processor 320. The first data processor 320 performs a protocol analysis and a provisional editing operation of the received data, a conversion of the edited data to intermediate code and a storing operation of the intermediate code in a first-in first-out memory (referred to as an FIFO memory hereinafter) 305. In the provisional editing operation for the received printing data, the printing position is determined every received printing data according to the result of the protocol analysis. Due to this, the intermediate code converted from the received printing data includes not only a pattern code converted from the received printing data but also the address of the BM-RAM 32 at which the pattern code is stored. The second data processor 330 reads out in order the intermediate code stored in the FIFO memory 305 by the first data processor 320 and processes it. In the process of the second data processor 330, the read intermediate code for controlling the print engine 4 is converted into a control command of the print engine 4 and is outputted to a print engine interface 307, and the data other than the read intermediate code for controlling the print engine 4 are outputted to the BMW 31 through a bit map writer interface 306.

Furthermore, the first data processor 320 outputs a LEDBLINK signal indicating whether or not the processor 320 is receiving data, directly to the second data processor 330 through a LEDBLINK line 350, and then, the second data processor 330 outputs data for controlling the operation of the indicator 912 to an input and output port circuit (not shown) of the operation panel 44 through an operation panel interface 310, so that the indicator 912 starts to flicker at a timing when the first data processor 320 receives the data.

When there is used a page description language interpreter 340 for converting the received printing data into graphic image data according to a program stored therein, the operation mode of the BMC 30 becomes a mode for processing all the data outputted from a dip switch (not shown) and the command data outputted from the external data processor 1 such as the page description language. In this mode, after the received data read out from the R-buffer memory 304 are sent to the page description language interpreter 340 through the first data processor 320, the data are processed in a working buffer memory installed in the page description language interpreter 340, and the processed data are sent to the second data processor 330, directly. The description of the process of the page description language interpreter 340 is omitted hereinafter, since it is not the subject matter of the present invention.

Figure 6:
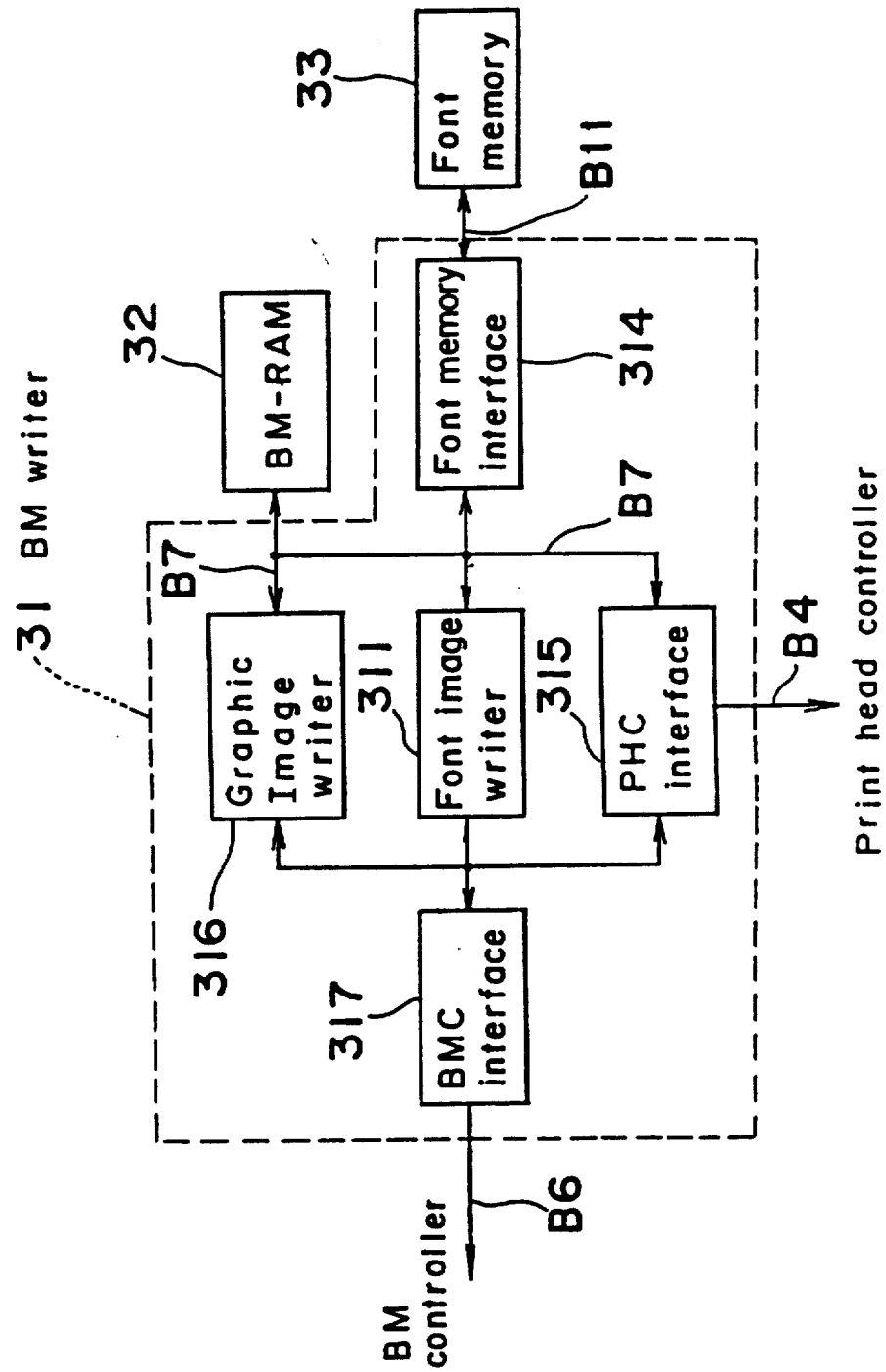
FIG. 6 is a block diagram showing a bit map writer shown in FIG. 4.

FIG. 6 is block diagram of the BMW 31 shown in FIG. 4.

Functions of the bit map writer 31 are generally classified into an imaging function onto the BM-RAM 32 and an outputting function for outputting the data stored in the BM-RAM 32 to the print engine 4 upon printing.

The imaging function is further divided into an imaging function for imaging lines and/or circles which is executed by a graphic image writer (referred to as a GIW hereinafter) 316, and an imaging function for imaging characters which is executed by a font image writer (referred to as an FIW hereinafter) 311. Both of the graphic and font image writers 316 and 311 operate according to packets of the intermediate code sent from the BMC 30 through a bit map controller interface (referred to as a BMC interface hereinafter) 317. The GIW 316 usually writes bit images in the BM-RAM 32 according to the results obtained by analyzing parameters included in a packet stored in the FIFO memory 305, while the FIW 311 usually writes font images in the BM-RAM 32 which have been read out from the font memory 33 through a font memory interface 314 according to the data included in the packet stored in the FIFO memory 305.

On the other hand, the outputting function for outputting data to the print engine 4 upon printing is executed by a print head controller interface (referred to as a PHC interface hereinafter) 315. That is, when the PHC interface 315 receives a PRINT START code sent from the BMC 30 through the BMC interface 317, it outputs the data stored in the BM-RAM 32 to the PHC 42, responsive to a synchronizing signal sent from the PHC 42 through the bus B4.

Figure 7:
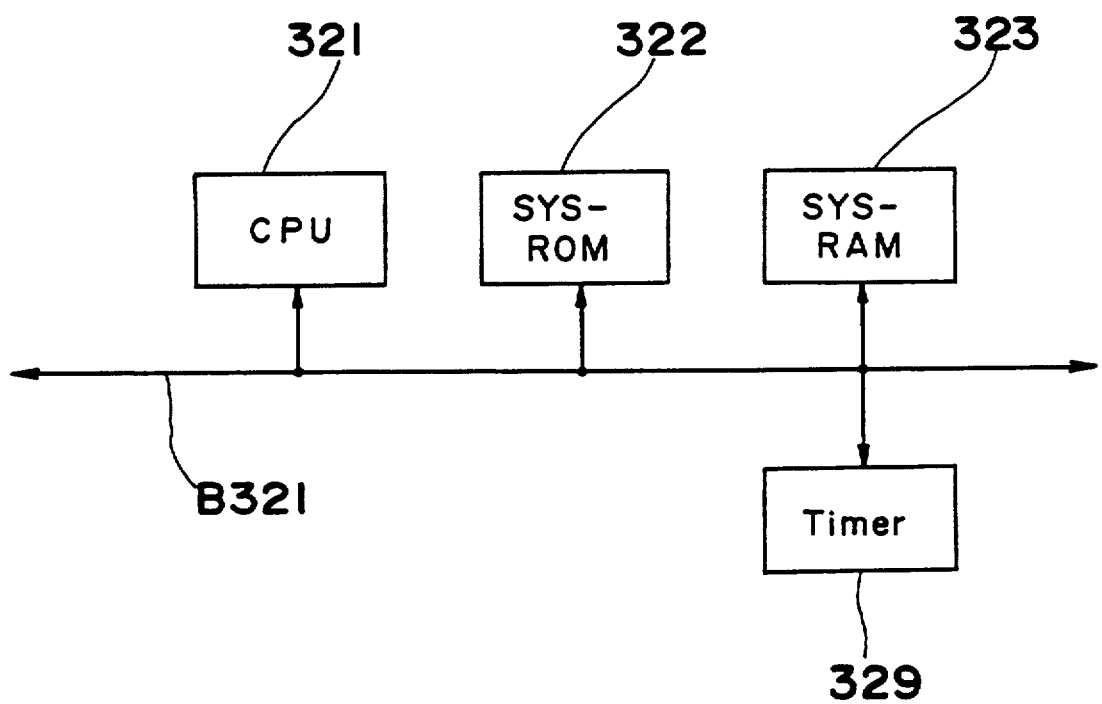
FIG. 7 is a block diagram of a first data processor shown in FIG. 5.

FIG. 7 is a block diagram of the first data processor 320 shown in FIG. 5.

The first data processor 320 comprises a CPU 321, a system ROM 322, a system RAM 323 and a timer 329, which are connected to each other through a bus B321. The system ROM 322 stores a system program therein, and the system RAM 323 is used as a working area for the CPU 321. Furthermore, the timer 329 is used for managing operation timings of the CPU 321.

It is to be noted that the composition of the second data processor 330 is similar to that of the first data processor 320.

(c) Display of operation state of printer system

Figure 19:
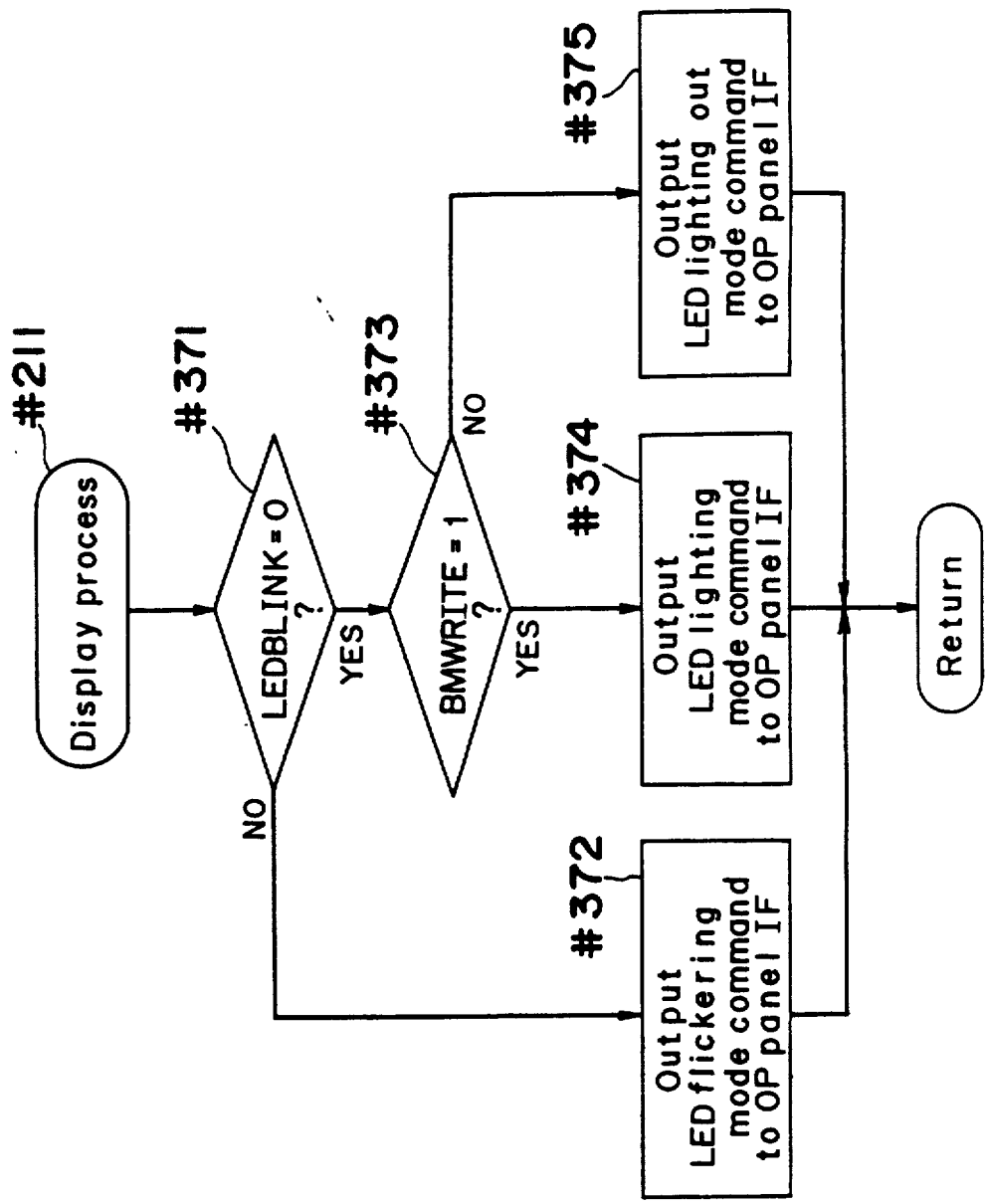
FIG. 19 is a flowchart of a display process executed by the second data processor shown in FIG. 5.

In the present preferred embodiment, the indicator 912 of the operation panel 44 is driven in different three modes composed of a flickering mode, a lighting mode and a lighting out mode so as to display a data receiving state, a data processing state and a waiting state thereon, respectively, as shown in FIG. 19. The indicator 912 notices the operation state of the printer system 10 to the operator at a look. Therefore, this operation of the indicator 912 can prevent the operator from feeling uneasy about such a state that the printer system 10 does not operate normally, and the operator can use the printer system 10, feeling at rest.

The data receiving state and the data processing state are detected as follows.

Figure 12:
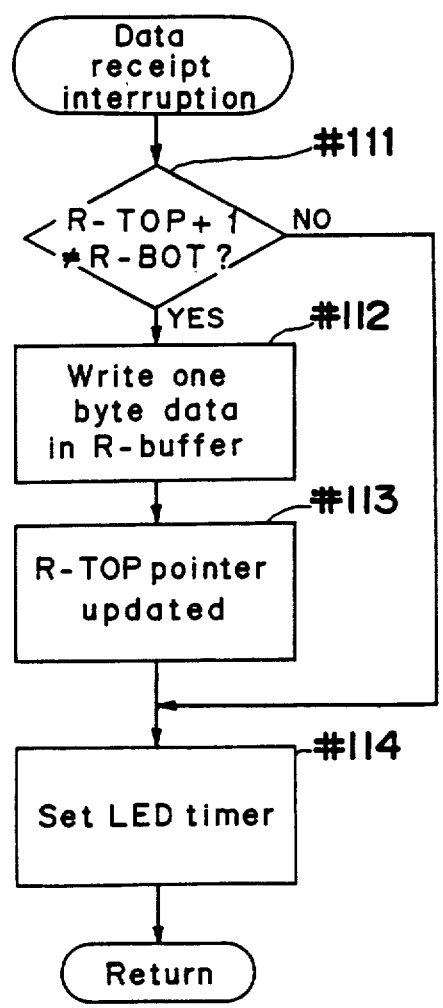
FIG. 12 is a flowchart of a data receipt interruption process executed by the first data processor shown in FIG. 5.
Figure 13:
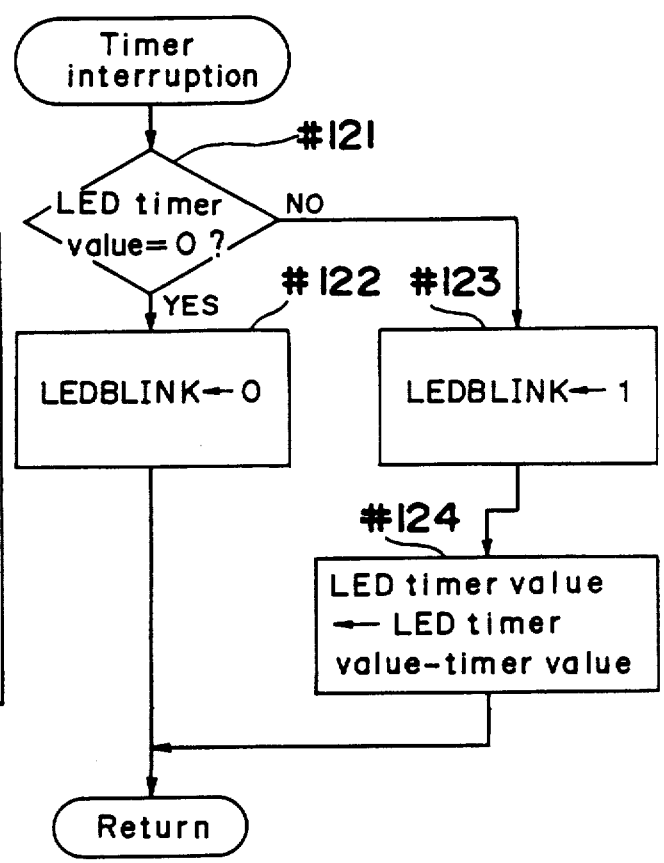
FIG. 13 is a flowchart of a timer interruption process executed by the first data processor shown in FIG. 5.

Every time the first data processor 320 of the BMC 30 receives each data input from the external data processor 1, the first data processor 320 outputs the LED-BLINK signal to the second data processor 330 for controlling the display operation of the indicator 912, as shown in FIGS. 12 and 13. It is to be noted that the LEDBLINK signal is outputted thereto continuously for a predetermined time. Therefore, even though the first data processor 320 receives data having a relatively short length at a relatively long time interval, the indicator 912 is turned on continuously for the predetermined time. Therefore, the operator can confirm the data receiving state easily.

It is judged whether or not the received data is processed, by detecting whether or not the printing data are stored in either the R-buffer memory 304, the FIFO memory 305, or the BM-RAM 32 of the printer system 10. When the page description language interpreter 340 is used, the printing data may be stored in the working buffer memory thereof. If the printing data of at least one character remain therein, the second data processor 330 judges that the printing data are being processed.

Figure 15A:
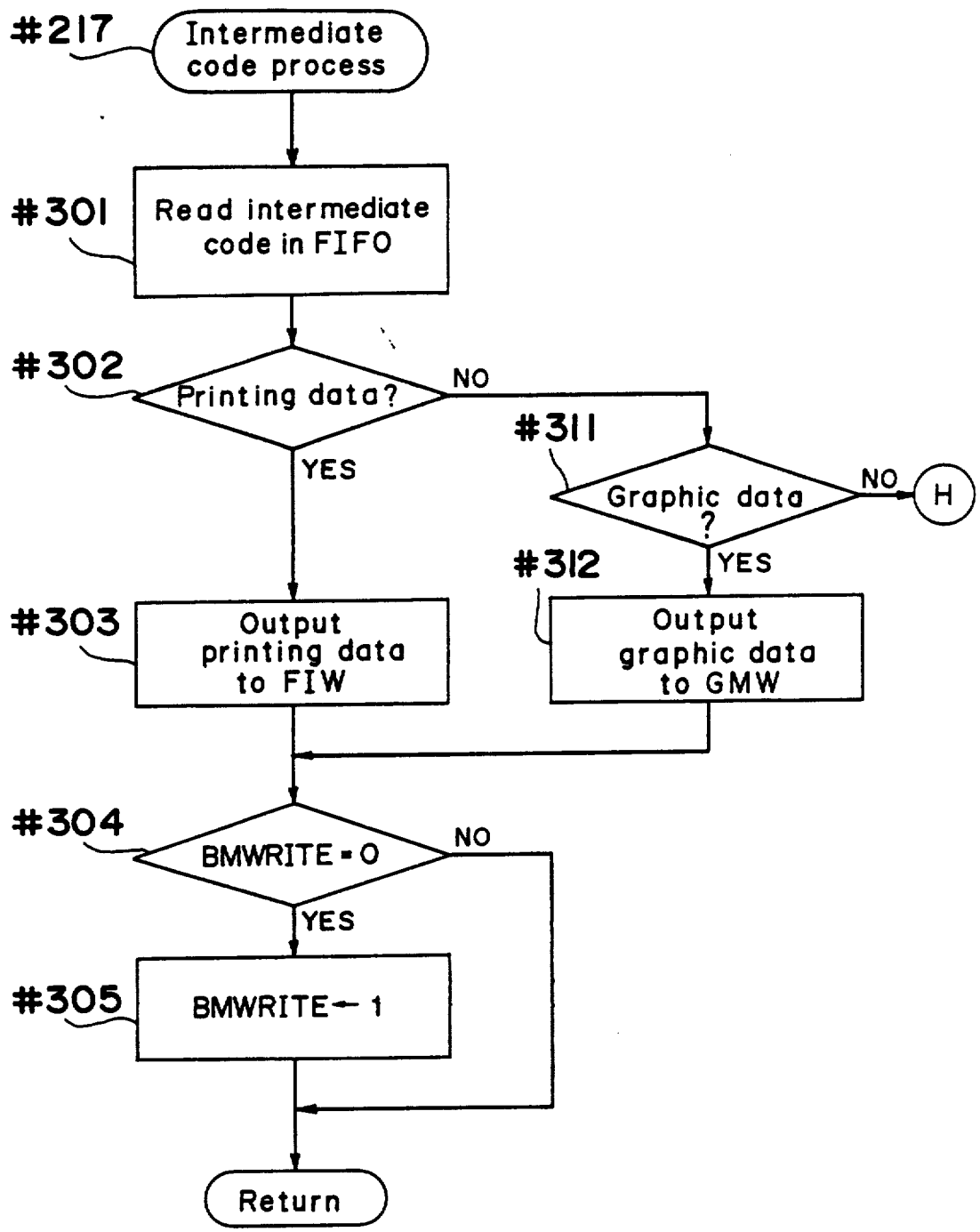
FIGS. 15a and 15b are flowcharts of an intermediate code process executed by the second data processor shown in FIG. 5.
Figure 15B:
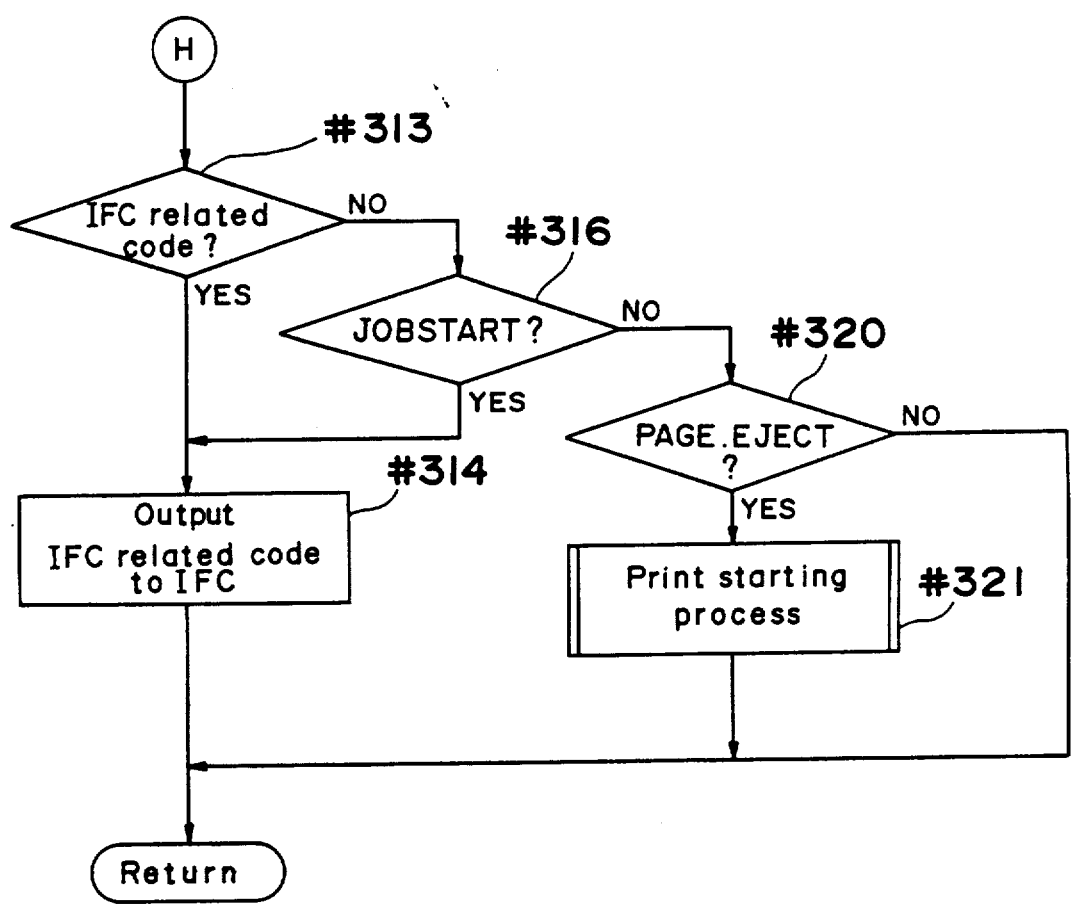
Figure 17:
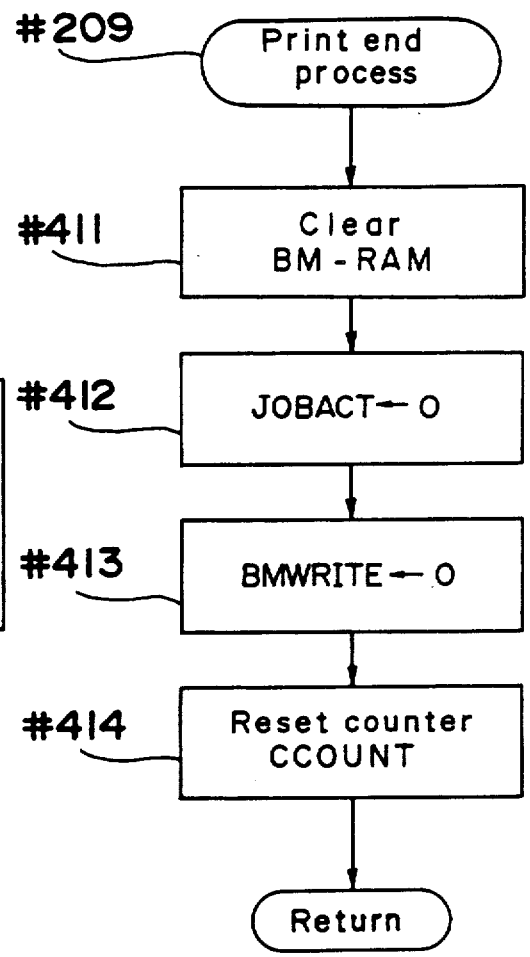
FIG. 17 is a flowchart of a print end process executed by the second data processor shown in FIG. 5.

In the present preferred embodiment, the second data processor 330 judges whether or not the printing data are stored in the BM-RAM 32 according to a BMWRITE flag, as shown in FIGS. 15a, 15b and 17. When the image data are stored in the BM-RAM 32, the BMWRITE flag is set at "1". Thereafter, when the printing operation is completed or when the writing operation of the image data into the BM-RAM 32 stops due to any trouble generated in the printer system 10, the BMWRITE flag is reset.

The second data processor 330 distinguishes either the data receiving state, the date processing state, or the waiting state according to the LEDBLINK signal and the BMWRITE flag, and also drives the indicator 912 in one mode corresponding to the distinguished state, as shown in FIG. 19.

The process for receiving the data and the process for processing the data are performed in parallel. However, priority is given to the process for displaying the data receiving state on the indicator 912. Because the operator wishes to confirm the completion of the data receiving operation prior to start of the data process.

It is to be noted that, in the case that it is desirable to display "the data processing state" thereon if the printing data of at least one character remain upon printing, it is necessary to judge whether or not the printing data are stored in the memories other than the BM-RAM 32. The first data processor 320 can detect easily whether or not the data are stored in the R-buffer memory 304 and the FIFO memory 305, and outputs the LED-BLINK signal for indicating the detected result, to the second data processor 330 through the LEDBLINK line 350. The second data processor 320 sets or resets the BMWRITE flag according to the LEDBLINK signal. Furthermore, when the page description language interpreter 340 is used, the operation mode of the BMC 30 becomes the mode for processing all the data outputted from the dip switch and the command data outputted from the external data processor 1. Then, the page description language interpreter 340 may perform the process in the manner similar to that of the first data processor 320.

(d) Control flow of bit map controller

The action of the printer system 10 will be described below with reference to the flowcharts shown in FIGS. 8 to 22a and 22b. The process of the printer system 10 is performed according to a main routine executed by the first data processor 320 and a main routine executed by the second data processor 330, which are executed in asynchronous with each other.

(d-1) Control flow of first data processor

<Main routine>

Figure 8:
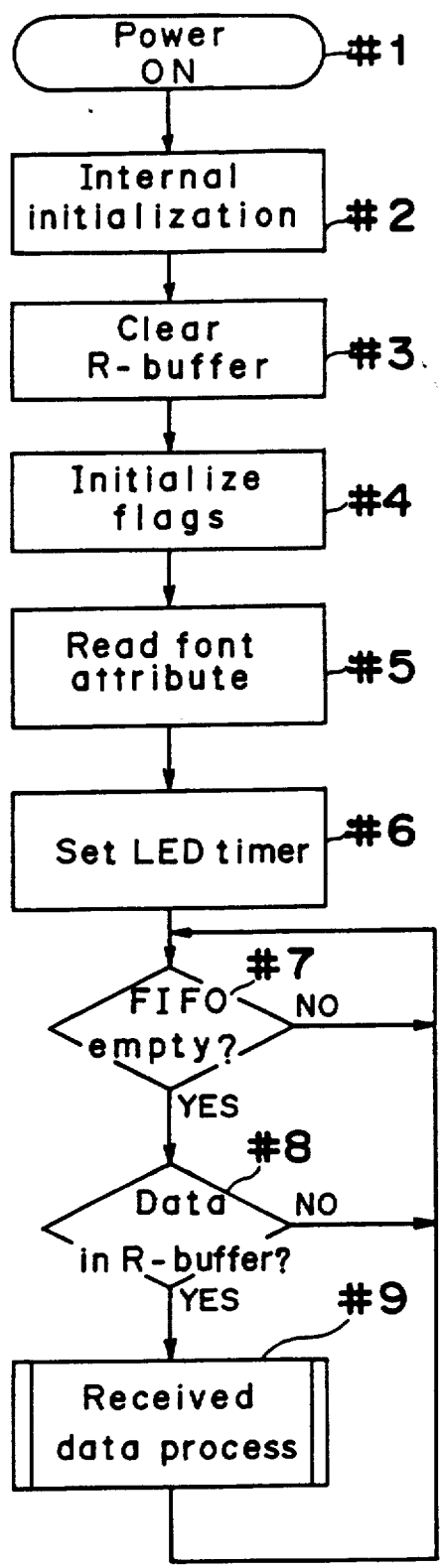
FIG. 8 is a flowchart of a main routine executed by the first data processor shown in FIG. 5.

FIG. 8 is a flowchart of a main routine executed by the first data processor 320 shown in FIG. 5.

Referring to FIG. 8, when the printer system 10 is turned on so as to supply the power thereto at step #1, the printer system 10 is internally initialized at step #2, and the data stored in the R-buffer memory 304 for storing data received from the external data processor 1 is cleared at step #3. Thereafter, control flags are initialized at step #4. Concretely, an LPWRITE flag for indicating that the printing data are provisionally edited in a received data process, and also the data stored in the FIFO memory 305 is cleared by hardware when the printer system 10 is turned on.

In the preparation operation for producing intermediate code, the font attribute is written therein at step #5 in order to provisionally edit the received data in asynchronous with a process for imaging characters in the BM-RAM 32 to be executed by the second data processor 330, and then, an LED timer is set at a predetermined time interval at step #6, wherein the LED timer is provided for judging whether or not a write pointer of the R-buffer memory 304 has been updated for the predetermined time interval in order to judge whether or not data is being received.

After the preparation operation at steps #2 to #6 is completed, the program flow goes to a main loop process of steps #7 to #9. The main loop process for analyzing the received data and converting the received data into intermediate code corresponding thereto is executed as follows. First of all, data input from the external data processor 1 are stored in the R-buffer memory 304 according to a receipt interruption routine shown in FIG. 12 which is started responsive to a request command outputted from the data processor interface 308 in asynchronous with the aforementioned main loop process.

In the main loop process, when the FIFO memory 305 for storing the intermediate codes is empty and data are stored in the R-buffer memory 304 (Yes at both steps #7 and #8), the received data stored in the R-buffer memory 304 are converted into intermediate code corresponding thereto according to the received data process at step #9 shown in FIGS. 9a to 9d, and the converted intermediate code is stored in the FIFO memory 305. Thereafter, when the received data process is completed, the program flow goes to step #7. On the other hand, when the FIFO memory 305 is not empty (No at step #7) or no data is stored in the R-buffer memory 304 (No at step #8), the program flow goes to step #7.

Data in a form of intermediate code which have been processed in the main routine executed by the first data processor 320 are outputted to the second data processor 330 through the FIFO memory 305. The intermediate code includes an address of the BM-RAM 32, which is calculated corresponding to selection of the font pattern and the size of the selected font pattern, at which the font pattern data are to be written, and the intermediate code is considered to be a provisionally edited code.

<Received data process>

Figure 9A:
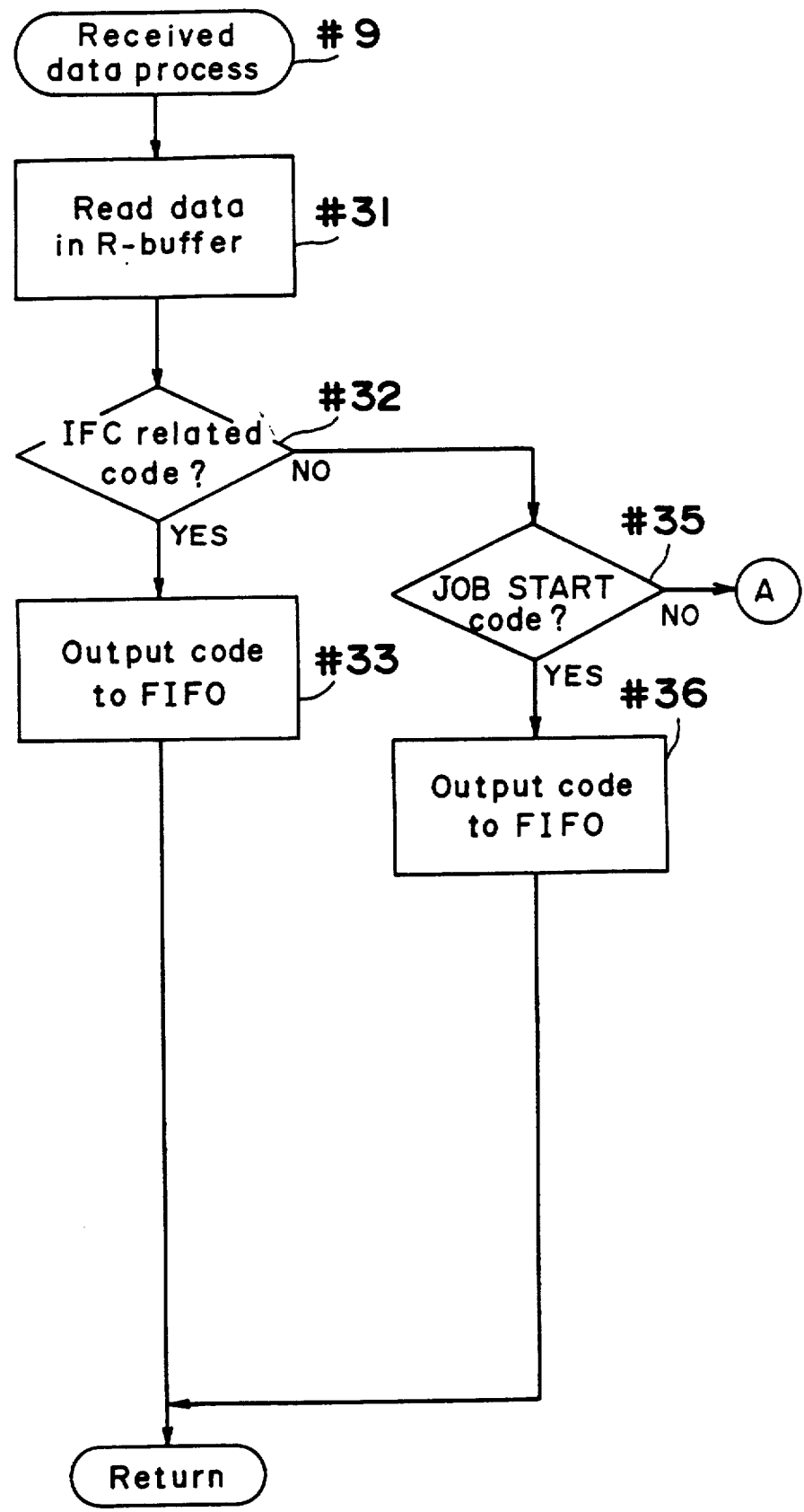
FIGS. 9a to 9d are flowcharts of a data receipt process executed by the first data processor shown in FIG. 5.
Figure 9B:
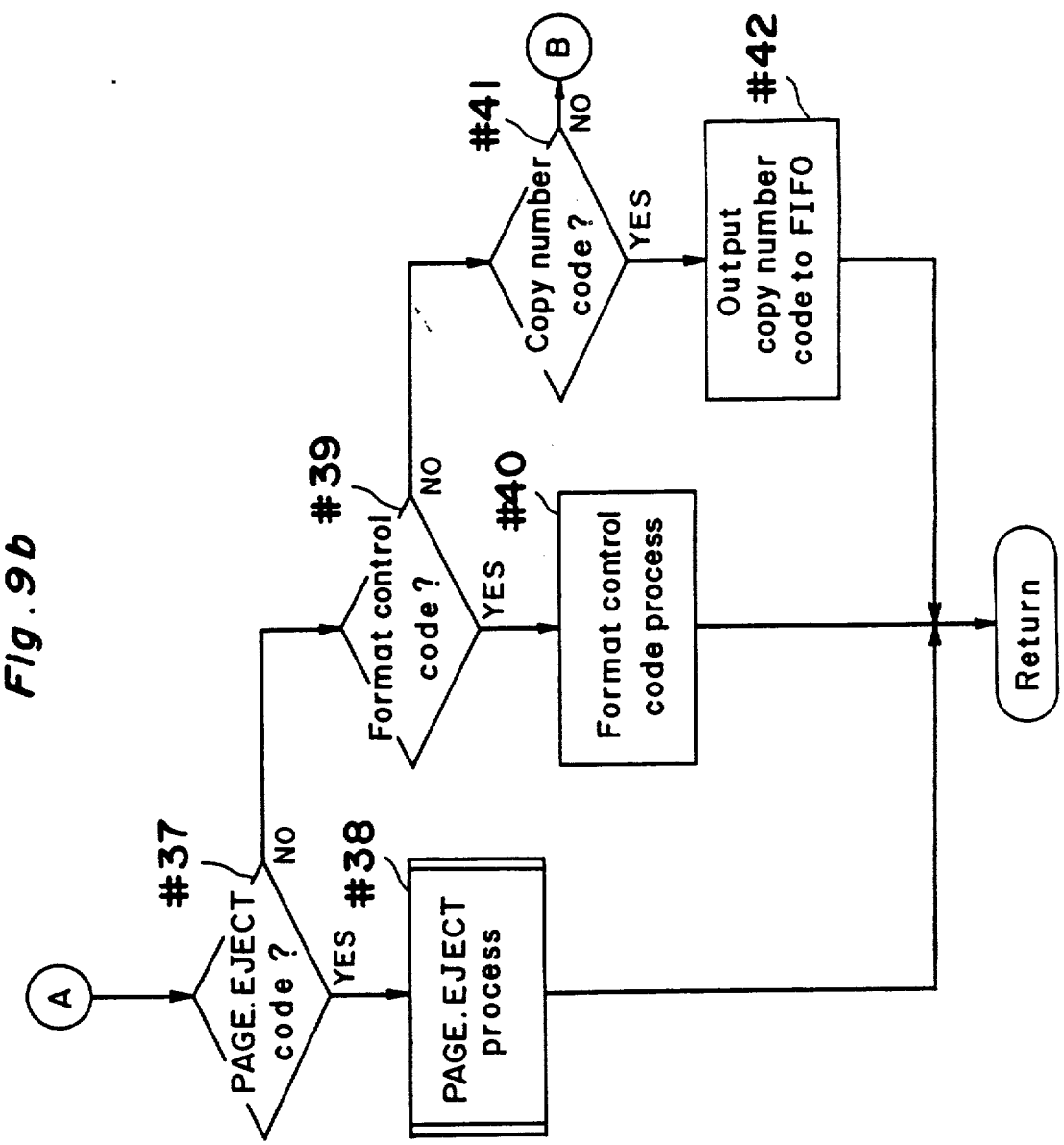
Figure 9C:
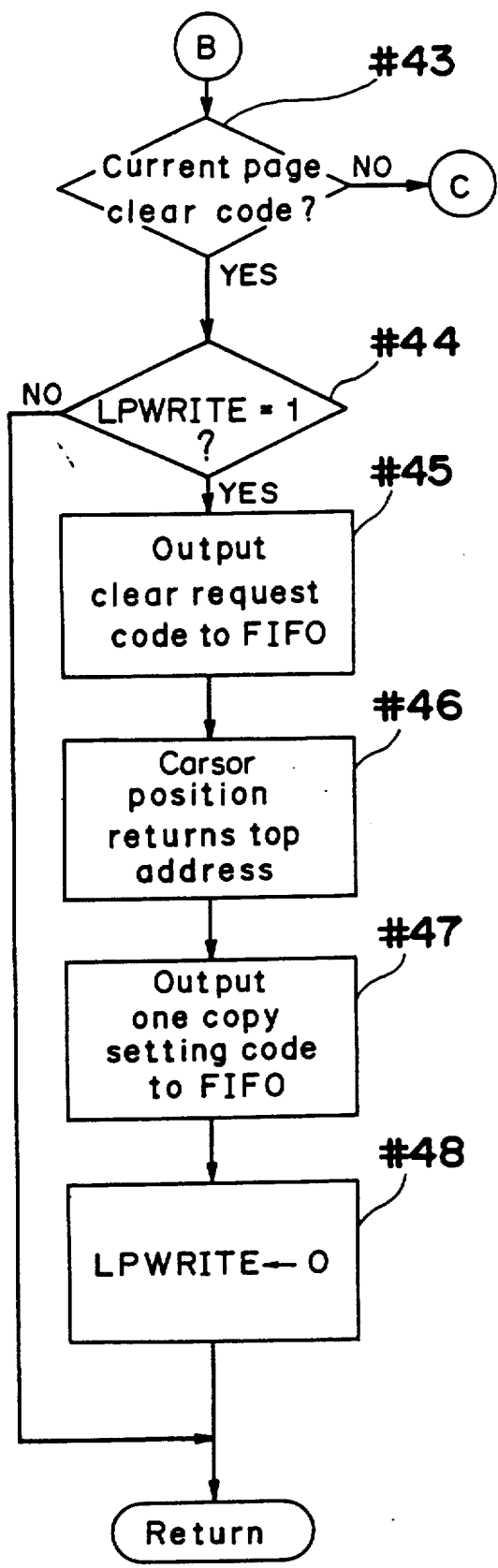
Figure 9D:
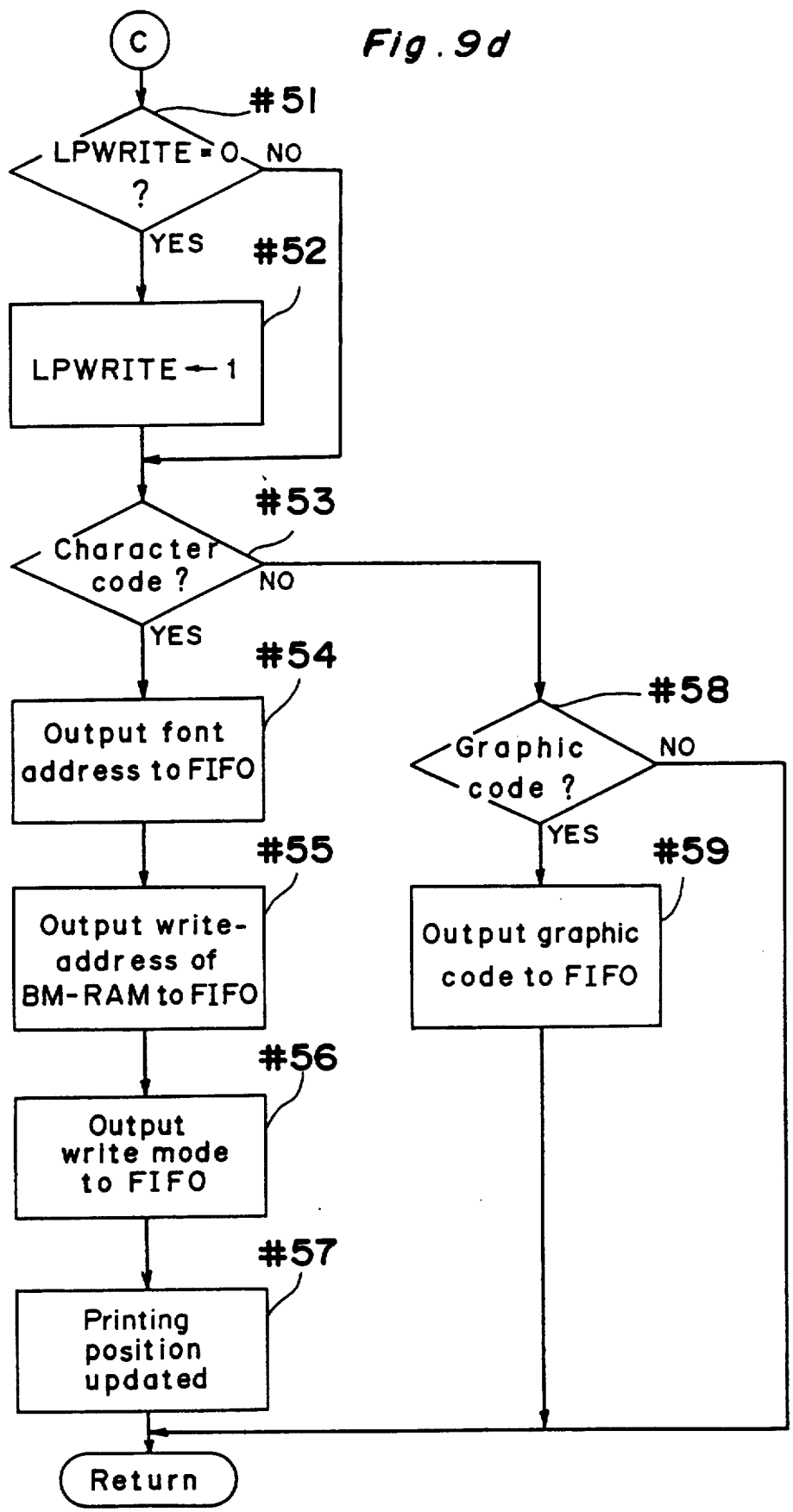

FIGS. 9a and 9b are flowcharts of the received data process (step #9 shown in FIG. 8). Data received by the BMC 30 are classified into four kinds of codes or data.

(a) An IFC related code relating to the print engine 4
(b) A JOB control code such as a JOBSTART code and a PAGE.EJECT code
(c) A format control code
(d) Printing data such as a character code and a graphic image code Referring to FIG. 9a, after the first data processor 320 reads out data stored in the R-buffer memory 304, it is judged whether or not the received data are either the IFC related code, the JOBSTART code, the PAGE.EJECT code, the format control code, a copy number code for indicating the number of copies, a current page clearing code, the character code, or the graphic image code at steps #32, #35, #37, #39, #41, #43, #53 and #58, respectively.

When the received data are the printing data (No at all steps #32, #35, #37, #39, #41 and #43), the received printing data are converted into intermediate code having a format corresponding thereto, and the converted intermediate code is outputted to the FIFO memory 305.

Namely, when the received data are a character code (Yes at step #53), the first data processor 320 outputs an address of the font pattern, a write address of the BM-RAM 32 corresponding to a printing position on an image area and a write mode command to the FIFO memory 305, sequentially, at steps #54 to #56, in respective formats which are the same as those to be outputted to the font image writer 311, and then, the printing position is updated in order to print the printing data at the next printing position at step #57. Thereafter, the program flow returns.

When the received data is a current page clear code (Yes at step #43), it is judged whether or not the LPWRITE flag is "1" at step #44. If the LPWRITE flag is "0" (No at step #44), the program flow returns. On the other hand, if the LPWRITE flag is "1" (Yes at step #44), it is judged that the image data are provisionally edited, and intermediated code of clearing request function is outputted to the FIFO memory 305 at step #45. Thereafter, in order to set the printer system 10 in a state for writing printing data of a new page in the BM-RAM 32, the position of the cursor is set at the top position of a page at step #46, and a function code for setting the number of copies at one is outputted to the FIFO memory 305 at step #47. Then, the LPWRITE flag is set at "0" at step #48, and then, the program flow returns. On the other hand, after starting to image the printing data in the BM-RAM 32, the second data processor 330 performs the clearing process when it receives the intermediate code of clearing request function. Therefore, the second data processor 330 can write the printing data in the BM-RAM 32 in synchronous with the printing data input from the first data processor 320.

When the received data is the IFC related code to be outputted to the IFC 40 (Yes at step #32), the IFC related code is converted into function type intermediate code having a format different from that of the printing data, and the converted code is outputted to the FIFO memory 305 at step #33. Thereafter, the program flow returns.

As the JOB control code, there are provided the PAGE.EJECT code for indicating a boundary between adjacent pages and the JOBSTART code for indicating a boundary between adjacent page groups, each page group being composed of plural pages.

When the received data is the JOB START code (Yes at step #35), the JOBSTART code is converted into function type intermediate code having a format different from that of the printing data in the manner similar to that of the IFC related code, and the converted code is outputted to the FIFO memory 305 at step #36. Thereafter, the program flow returns.

Figure 10:
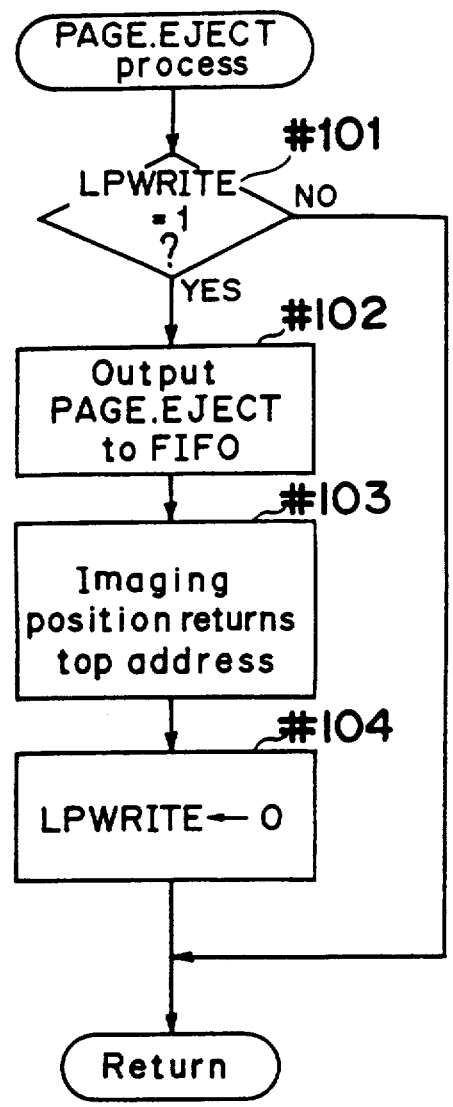
FIG. 10 is a flowchart of a PAGE.EJECT process executed by the first data processor shown in FIG. 5.

When the received data is the PAGE.EJECT code (Yes at step #37), the PAGE.EJECT code is converted into function type intermediate code having a format different from that of the printing data in a PAGE.EJECT process shown in FIG. 10 in the manner similar to that of the IFC related code, and then, the converted code is outputted to the FIFO memory 305 at step #38. Thereafter, the program flow returns.

When the received data is the format control code (Yes at step #39), the format control code process for controlling a format for printing is executed at step #40, and the program flow returns.

When the received data is the copy number code for specifying the number of copies upon copying the same image on a sheet of copying paper (Yes at step #41), the copy number code is converted into function type intermediate code corresponding thereto, and the converted code is outputted to the FIFO memory 305 at step #42. Thereafter, the program flow returns.

<PAGE.EJECT process>

FIG. 10 is a flowchart of the PAGE.EJECT process (step #38) shown in FIG. 9b. The PAGE.EJECT process is a virtual process for converting the PAGE.EJECT code into intermediate code to be outputted to the FIFO memory 305, and is different from a process for discharging a sheet of copying paper actually in an intermediate code process shown in FIGS. 15a and 15b.

In the PAGE.EJECT process shown in FIG. 10, it is judged whether or not the LPWRITE flag is "1", namely, the image data are not being edited provisionally at step #101. If the LPWRITE flag is "0", namely, if the image data are being edited provisionally (No at step #101), the program flow returns. On the other hand, if the LPWRITE flag is "1", namely, if the image data are not being edited provisionally (Yes at step #101), the PAGE.EJECT code is converted into intermediate code for indicating the PAGE.EJECT, and the converted code is outputted to the FIFO memory 305. In this process, an actual operation for discharging a sheet of copying paper is executed when the second data processor 330 receives the intermediate code for indicating the PAGE.EJECT. Thereafter, the printing position is returned to the top position of a page in order to prepare the editing operation for the next page at step #103, and the LPWRITE flag is reset to zero at step #104. Thereafter, the program flow returns.

As described above, the operation of steps #102 to #104 is executed after it is judged that the LPWRITE flag for indicating that the image data are being edited provisionally is "1", in order to prevent a sheet of copying paper, on which no image and/or characters are printed, from being discharged.

<Data receipt interruption process>

FIG. 12 is a flowchart of the data receipt interruption process executed by the first data processor 320.

In order to improve the throughput of the external data processor 1, data input from the external data processor 1 through the data processor interface 308 are stored in the R-buffer memory 304, temporarily, as shown in FIG. 5.

Figure 11:
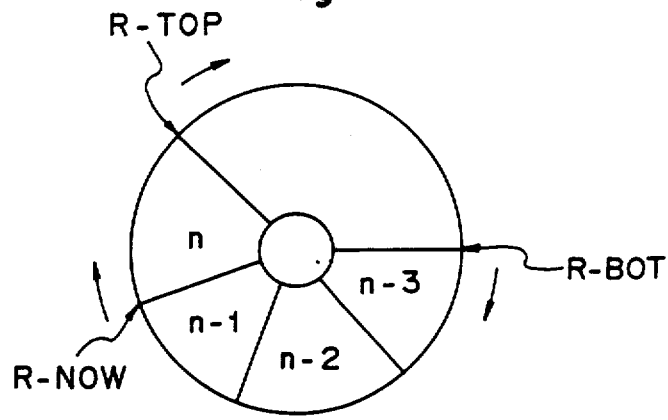
FIG. 11 is a memory map of an R-buffer memory shown in FIG. 5.

FIG. 11 shows a memory map of the R-buffer memory 304. As shown in FIG. 11, the R-buffer memory 304 is a ring type memory, wherein data can be stored or read out as if the top address thereof follows the last address thereof, in the manner well known by those skilled in the art. The address thereof is managed by using an R-BOT pointer for indicating an address for storing the oldest data, an R-TOP pointer for indicating an address for storing the latest data, and an R-NOW pointer for indicating an address for storing the data which is processed at present.

As shown in FIG. 12, when an interruption signal of the data receipt interruption is input to the first data processor 320, it is judged according to the relationship between respective addresses indicated by the R-TOP pointer and the R-BOT pointer, whether or not the R-buffer memory 304 is empty at step #111. Namely, at step #111, it is judged whether or not the sum of "one" and the address indicated by the R-TOP pointer is equal to the address indicated by the R-BOT pointer. If the R-buffer memory 304 is empty (Yes at step #111), the received data are stored at an address indicated by the R-TOP pointer at step #112, and the address indicated by the R-TOP pointer is updated, namely, it is incremented by one at step #113. Thereafter, the program flow goes to step #114.

On the other hand, if the R-buffer memory 304 is not empty (No at step #111), the program flow goes to step #114, directly.

At step #114, the LED timer is reset at the time interval because the data have been received, and then, the program flow returns.

<Timer interruption process>

FIG. 13 is a flowchart of a timer interruption process executed by the first data processor 320.

Referring to FIG. 13, when an interruption signal of the timer interruption is input to the first data processor 320, it is judged whether or not the count of the LED timer becomes zero, the LED timer has counted the predetermined time interval at step #121. If the LED timer has counted the predetermined time interval (Yes at step #121), an LEDBLINK flag is set at "0" and the LEDBLINK signal is set at a low level so as not to light the indicator 912 because the data receipt process is completed, and then, the program flow returns. On the other hand, if the LED timer has not counted the predetermined time interval (No at step #121), the LEDBLINK flag is set at "1", namely, the LEDBLINK signal is set at a high level so as to make the indicator 912 flicker because the data are being received, and then, the count of the LED timer is decreased by a value corresponding to a passed time at step #124. Thereafter, the program flow returns.

(d-2) Control flow of second data processor

FIGS. 14a, 14b, 15a, 15b and 16 to 19 are flowcharts of processes executed by the second data processor 330.

<Main routine>

Figure 14A:
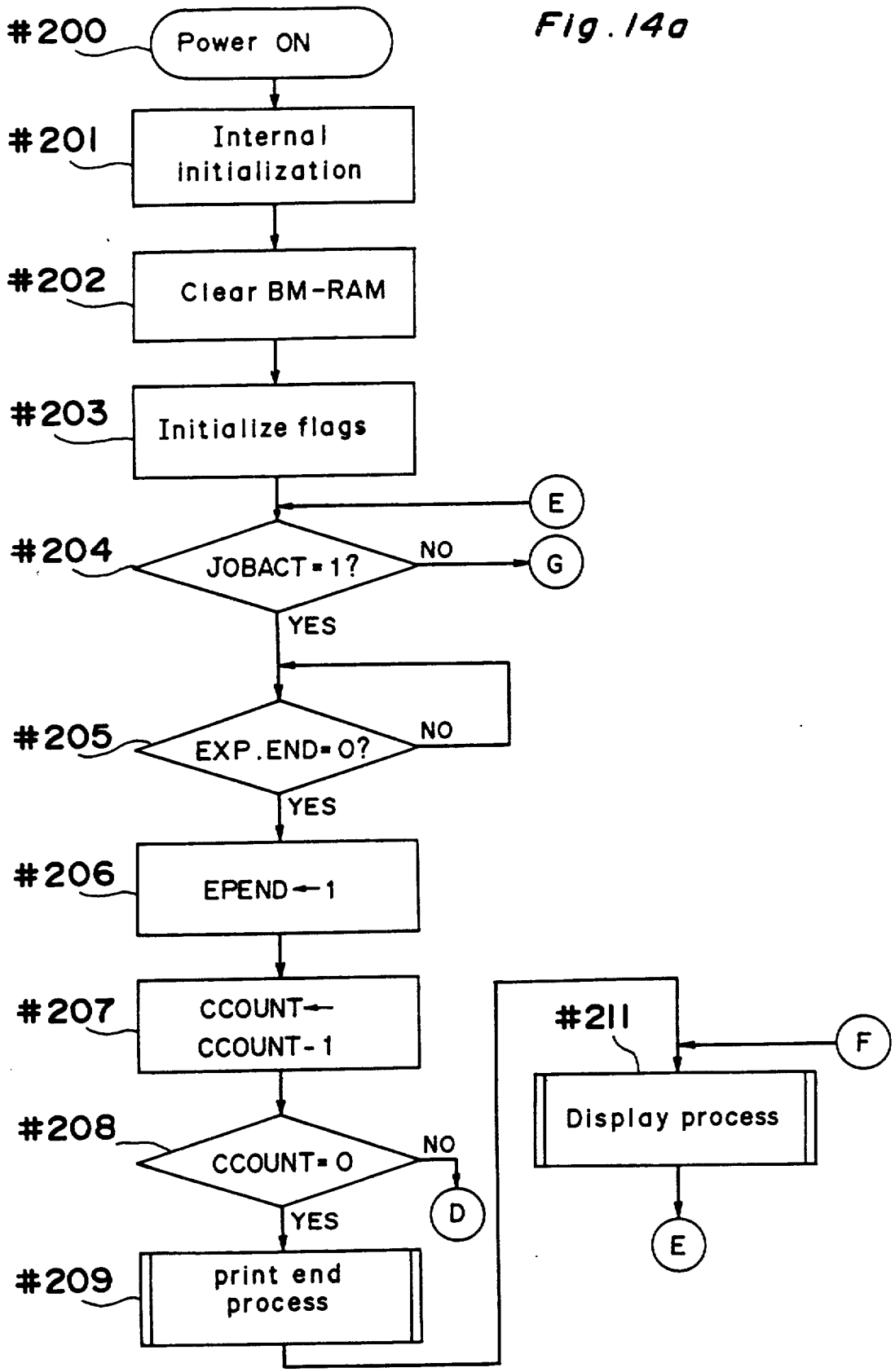
FIGS. 14a and 14b are flowcharts of a main routine executed by a second data processor shown in FIG. 5.
Figure 14B:
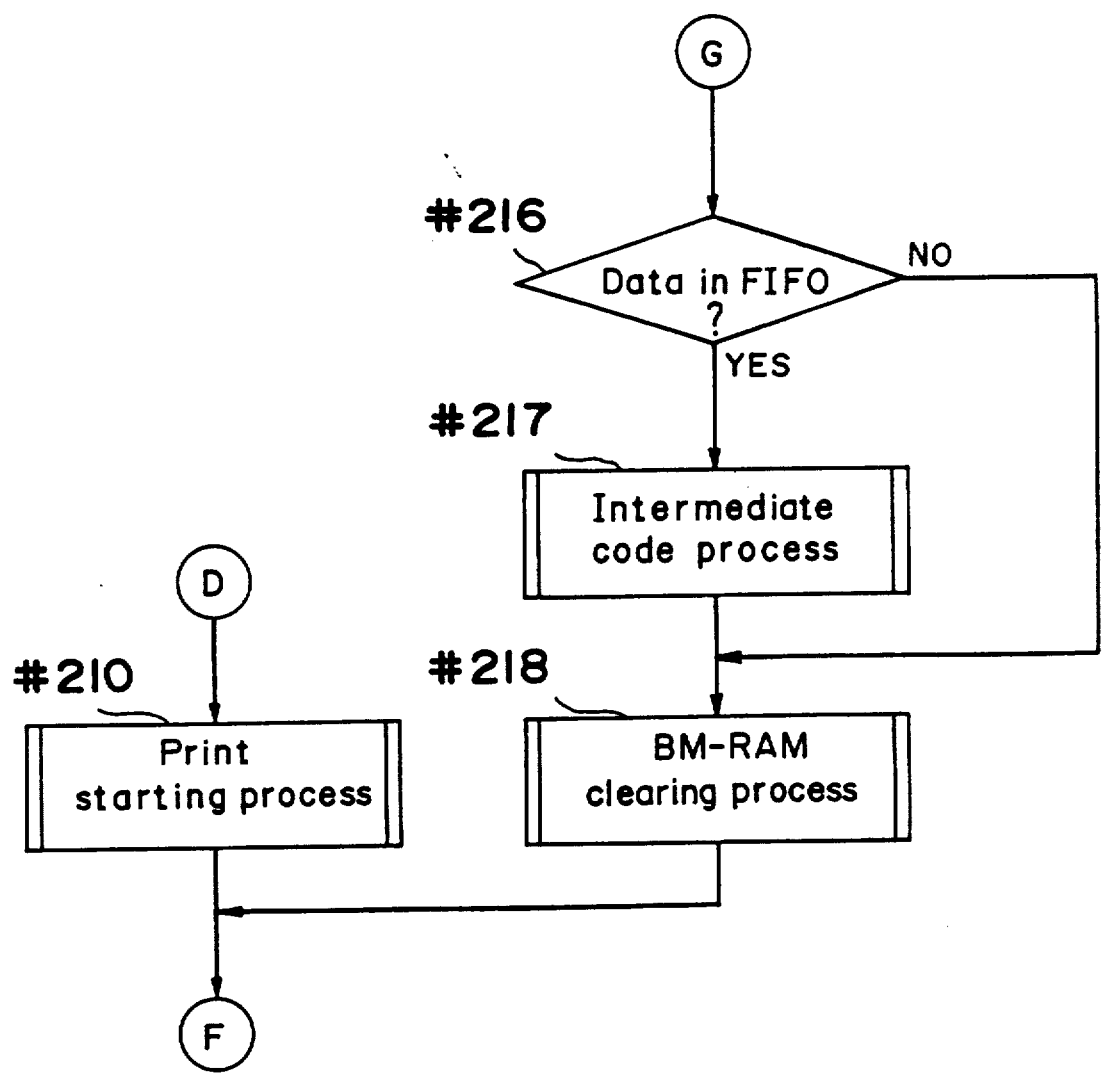

FIGS. 14a and 14b are flowcharts of a main routine executed by the second data processor 330.

Referring to FIG. 14a, a preparation operation is executed at steps #201 to #203 in the manner similar to that of the first data processor 320 (steps #2 to #4). Namely, first of all, after the printer system 10 is turned on so as to supply the power thereto at step #200, the second data processor 330 is internally initialized at step #201, and data stored in the image area of the BM-RAM 32 are cleared at step #202.

Thereafter, various kinds of control flags are initialized at step #203. Concretely, a JOBACT flag for indicating the printing state is reset to zero, and a BMWRITE flag for indicating the imaging state upon imaging the printing data on the BM-RAM 32 is reset to zero. Thereafter, a COPY flag for indicating the number of copies upon copying the same image on a sheet of copying paper is set at "1", and the count CCOUNT of a counter for counting the number of copies upon copying the same image on a sheet of copying paper is set at "1". Further, a CLEAR flag for indicating that a clearing request code has been input thereto from the first data processor 320 is reset to zero, and a PFCM flag for permitting to feed a sheet of copying paper previously is set at "1". Furthermore, a BPFM flag for indicating that data having been stored already in the BM-RAM 32 is to be outputted and to be reset to zero, and an EPEND flag for indicating that an interruption signal of an exposure end command has been input from the print engine 4 is reset to zero.

After the aforementioned preparation operation is completed, the program flow enters a main loop process. The main loop process mainly comprises:

(a) an intermediate code process (step #217) including an analysis process of intermediate code and an imaging process for imaging the printing data on the BM-RAM 32, (b) a control process for controlling a printing sequence (steps #205 to #210), and (c) a display process (step #211), in addition to a BM-RAM clearing process (step #218).

The main loop process of the main routine of the second data processor 330 is executed as follows.

Figure 18:
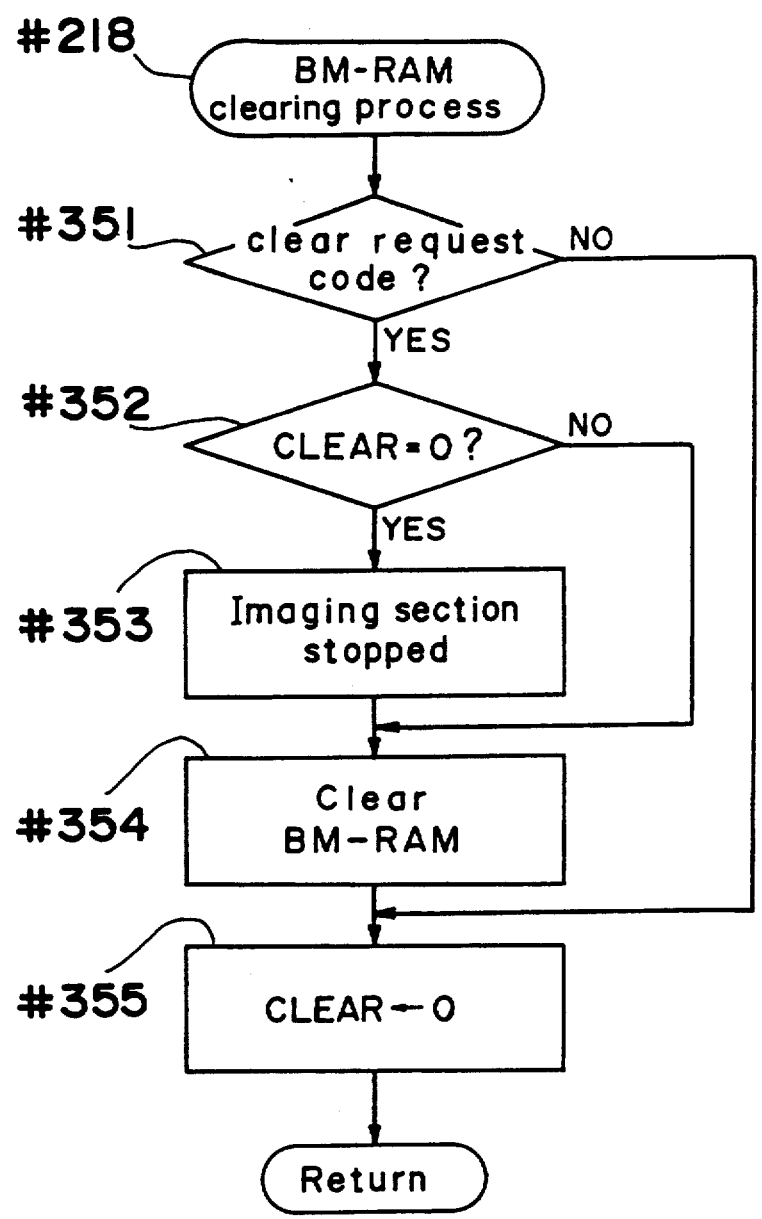
FIG. 18 is a flowchart of a BM-RAM clearing process executed by the second data processor shown in FIG. 5.

First of all, it is judged whether or not the JOBACT flag for indicating the condition for discharging a sheet of copying paper is "1" at step #204. If the JOBACT flag is "1" (Yes at step #204), the program flow enters a printing sequence process (steps #205 to #210). On the other hand, if the JOBACT flag is "0" (No at step #204), it is judged whether or not intermediate code is stored in the FIFO memory 305 at step #216. If the intermediate code is stored in the FIFO memory 305 (Yes at step #216), the intermediate code process shown in FIGS. 15a and 15b is executed at step #217, and then, the program flow goes to step #218. On the other hand, if the intermediate code is not stored in the FIFO memory 305 (No at step #216), the program flow goes to step #218. At step #218, the BM-RAM clearing process is executed as shown in FIG. 18, and then, the program flow goes to step #211. At step #211, the display process is executed as shown in FIG. 19, and then, the program flow goes back to step #204, executing the following process.

Because the JOBACT flag has been set at "1" since a printing starting process (step #321) is executed in the intermediate code process at step #217, the program flow goes from step #204 to step #205, and then, the second data processor 330 becomes a waiting state for the interruption signal of the exposure end command to be input from the interface controller 40 of the print engine 4.

When the second data processor 330 receives the interruption signal of the exposure end command at step #205, the EPEND flag becomes "1", and then, the program flow goes out from a loop of step #205. Thereafter, the control process for copying the same image on a sheet of copying paper is executed at steps #206 to #210 as follows.

Figure 16:
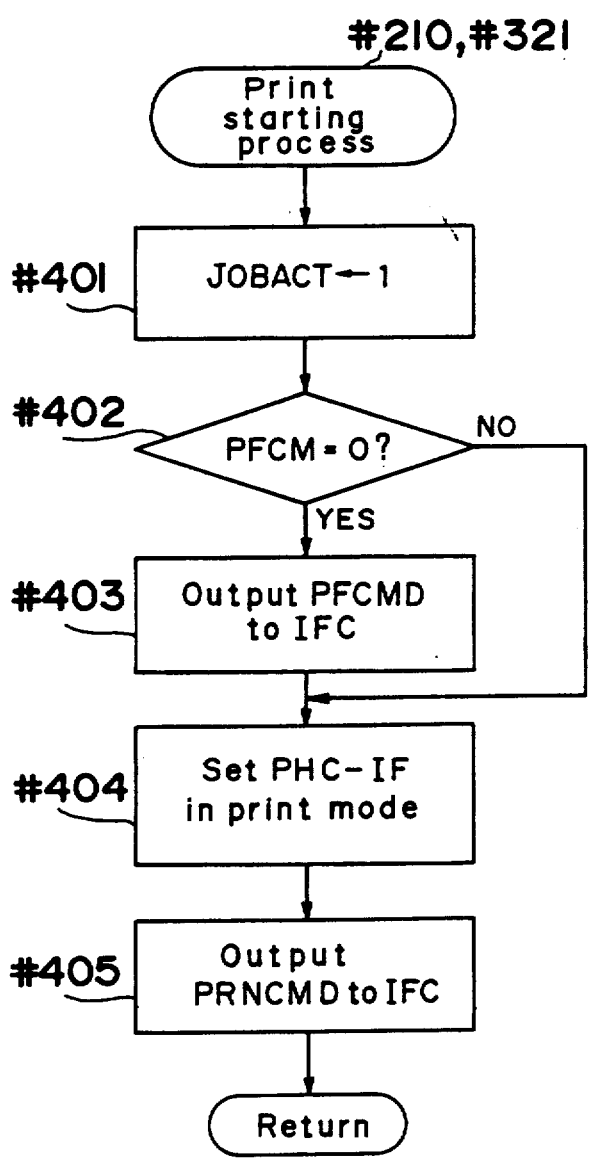
FIG. 16 is a flowchart of a print starting process executed by the second data processor shown in FIG. 5.

First of all, the EPEND flag is set at "1" at step #206 so as to indicate that the interruption signal thereof has been input thereto, and the count CCOUNT of the counter for counting the number of copies is decremented by one at step #207. Thereafter, it is judged whether or not the count CCOUNT is zero, namely, the copying operation for a preset number of copies is completed at step #208. If the copying operation therefor is completed (Yes at step #208), a print end process is executed at step #209 as shown in FIG. 17, and then, the program flow enters the display process of step #211. On the other hand, if the copying operation is not completed (No at step #208), the program flow enters the print starting process of step #210, and then, the print operation for copying the same image on a sheet of copying paper is executed, as shown in FIG. 16. It is to be noted that the JOBACT flag is set at "1" at step #401, as shown in FIG. 16, in the print starting process.

After the print starting process is completed, the aforementioned display process is executed at step #211, and then, the program flow goes back to step #204 so as to execute the next main loop process.

<Intermediate code process>

FIGS. 15a and 15b are flowcharts of the intermediate code process (step #217) shown in FIG. 14b for processing the intermediate code stored in the FIFO memory 305. The intermediate code process mainly comprises:

(a) an imaging process for imaging the printing data on the BM-RAM 32 according to the intermediate code, and (b) an outputting process for outputting a command to the print engine 4.

Referring to FIG. 15a, the second data processor 330 reads out the intermediate code stored in the FIFO memory 305, and it is judged whether or not the read intermediate code is either the printing data, the graphic image data, the IFC related code, the JOBSTART code, or the PAGE.EJECT code, at steps #302, #311, #313, #316 and #320, respectively. If the read intermediate code is not one of these data or code, the program flow returns, directly.

When the read intermediate code is the printing data (Yes at step #302), the intermediate code of the printing data is outputted to the FIW 311 of the BMW 31 through the bus B6 at step #303, and then, the program flow goes to step #304. On the other hand, when the read intermediate code is the graphic image data (Yes at step #311), the intermediate code of the graphic image data is outputted to the GIW 316 of the BMW 31, and then, the program flow goes to step #304. At step #304, it is judged whether or not the BMWRITE flag is "0", namely, data are written in the BM-RAM 32 at first. If the BMWRITE flag is "0" (Yes at step #304), the BMWRITE flag is set at "1", and then, the program flow returns. On the other hand, if the BMWRITE flag is "1" (No at step #304), the program flow returns, directly.

When the read intermediate code is either the IFC related code or the JOB START code (Yes at step #313 or #316), the read intermediate code is outputted to the IFC 40 at step #314, and then, the program flow returns.

As described above, as far as the intermediate code is stored in the FIFO memory 305, the intermediate code is outputted to the BMW 31, sequentially. However, when the read intermediate code is the PAGE. EJECT code (Yes at step #320), the print starting process is executed at step #321 as shown in FIG. 16 because data and/or code of one page have been converted into predetermined code, and then, the program flow returns.

<Print starting process>

FIG. 16 is a flowchart of the print starting process (steps #210 and #321).

Referring to FIG. 16, first of all, the JOBACT flag is set at "1" at step #401 in order to inhibit the BM-RAM 32 from being updated, and then, it is judged whether or not the PFCM flag for indicating that a sheet of copying paper should be fed previously is "0" at step #402. Only when the PFCM flag is "0" (Yes at step #402), the PFCMD command for feeding a sheet of copying paper to the IFC 40 at step #403. Thereafter, the PHC interface 315 is set in such a state that the printing operation can be performed at step #404, and then, the print command PRNCMD is outputted to the IFC 40 at step #405. Thereafter, the program flow returns.

On the other hand, the PHC interface 315 reads out the data stored in the BM-RAM 32, and outputs them to the PHC 42 in synchronous with a pulse sent from a control circuit of the PHC 42.

<Print end process>

FIG. 17 is a flowchart of the print end process (step #209) shown in FIG. 14a.

Referring to FIG. 17, data stored in the BM-RAM 32 are cleared at step #411 in order to image the printing data thereon, and the JOBACT flag is reset in order to cancel the printing state at step #412. Thereafter, the BMWRITE flag for indicating the state of imaging the printing data on the BM-RAM 32 is reset at step #413, and then, the counter for counting the number CCOUNT of copies is reset at step #414. Thereafter, the program flow returns.

<BM-RAM clearing process>

FIG. 18 is a flowchart of the BM-RAM clearing process (step #218) shown in FIG. 14b. The BM-RAM clearing process is executed compulsorily after the imaging operation for imaging the previous characters or graphic image on the BM-RAM 32 is suspended even though the imaging operation is being executed.

Referring to FIG. 18, first of all, it is judged whether or not the intermediate code read out from the FIFO memory 305 in the intermediate code process (step

217 of FIG. 14b) shown in FIG. 17 is the clear request code at step #351. If the read intermediate code is not the clear request code (No at step #351), a CLEAR flag is set at "0" at step #355, and then, the program flow returns.

On the other hand, if the read intermediate code is the clear request code (Yes at step #351), it is judged whether or not the CLEAR flag is "0", namely, the current page clear code is sent from the external data processor 1 at step #352. If the CLEAR flag is "0" (Yes at step #352), the operation of the BMW 31 is stopped at step #353, and then, the program flow goes to step #354. On the other hand, if the CLEAR flag is "1" (No at step #352), the program flow goes to step #354, directly.

At step #354, data stored in the BM-RAM 32 are cleared, and the CLEAR flag is reset at step #355. Thereafter, the program flow returns.

<Display process>

FIG. 19 is a flowchart of the display process (step #211) shown in FIG. 14a, which is the subject matter of the present preferred embodiment according to the present invention.

Referring to FIG. 19, first of all, it is judge whether or not the LEDBLINK flag corresponding to the LEDBLINK signal sent directly from the first data processor 20 to the second data processor 330 is "0" at step #371. If the LEDBLINK flag is "0" (Yes at step #371), it is judged whether or not the BMWRITE flag is "1" at step #373.

When the LEDBLINK flag is "1" (No at step #371), a command for making the indicator 912 flicker is outputted to the operation panel 44 through the operation panel interface 310 at step #372 because data are being received, and then, the program flow returns.

When the LEDBLINK flag is "0" (Yes at step #371) and the BMWRITE flag is "1" (Yes at step #373), a command for turning on the indicator 912 is outputted thereto at step #374 because the received data are being processed, and then, the program flow returns.

When the LEDBLINK flag is "0" (Yes at step #371) and the BMWRITE flag is "0" (No at step #373), a command for turning off the indicator 912 is outputted thereto at step #375 because the BMC 30 is in a waiting state, and then, the program flow returns.

(e) Control flow of interface controller of print engine

Figure 20:
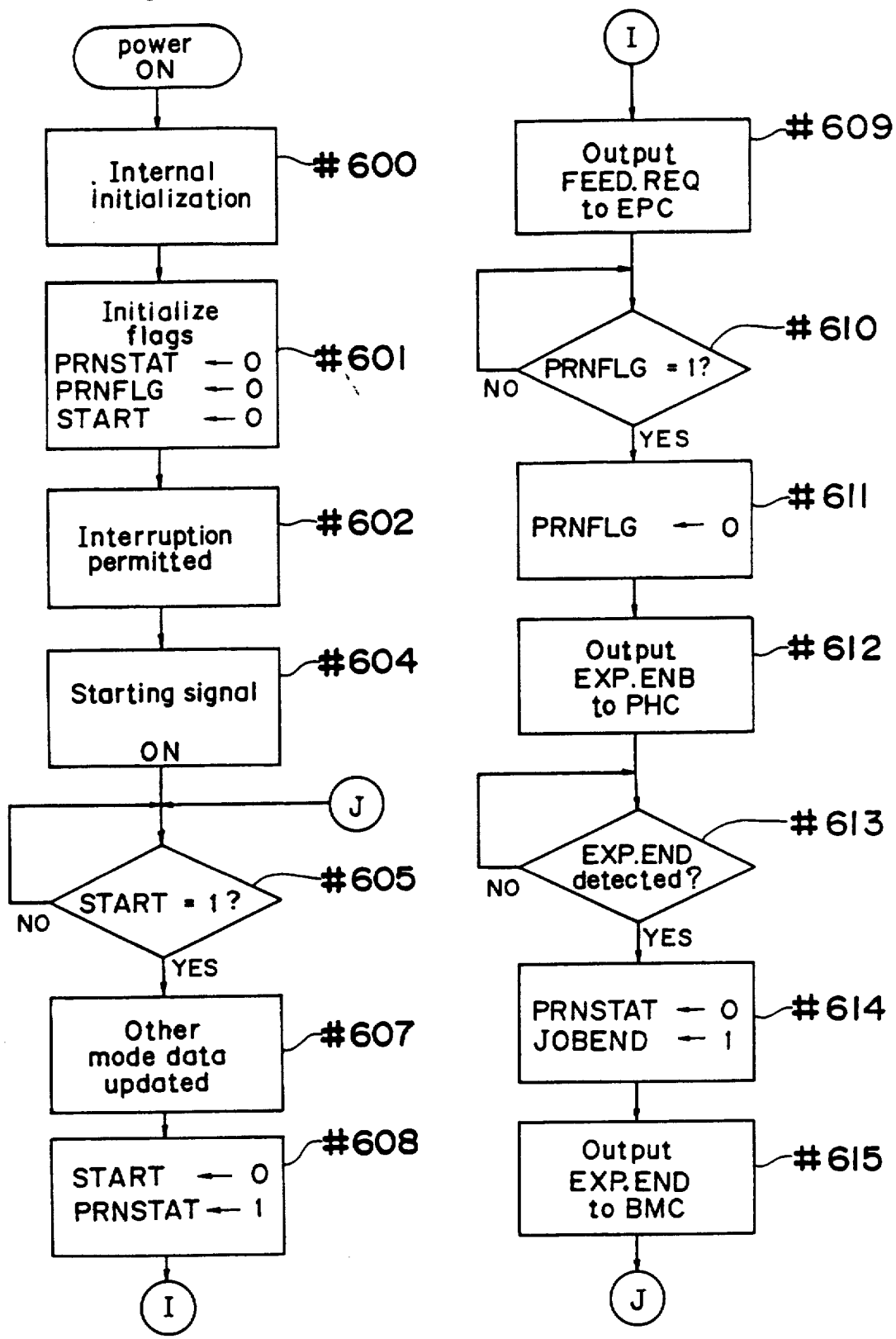
FIG. 20 is a flowchart of a main routine executed by an interface controller of the print engine shown in FIG. 4.

FIG. 20 is a flowchart of the interface controller 40 of the print engine 4.

Referring to FIG. 20, the interface controller 40 is internally initialized at step #600, and respective flags are initialized at step #601. Functions of respective flags are as follows:

PRNSTAT flag: representing that the printing operation is being executed in the print engine 4.

START flag: representing that the PRNCMD command input from the BMC 30 has been detected. (See steps #657 and #658 shown in FIG. 21a.)

PRNFLAG flag: representing that the PFCMD command input from the BMC 30 has been detected. (See steps #695 and #660 shown in FIG. 21b.)

After initializing respective flags at step #601, two interruption processes are permitted at step #602, wherein one is a BMC interruption process (shown in FIGS. 21a and 21b) for receiving commands input from the BMC 30, and another is a system timer interruption process (shown in FIGS. 22a and 22b) for controlling the operation panel 44 and performing the timer process. Thereafter, a starting signal is outputted to all of the sorter 6, the external paper feeding unit 5, the electrophotographic process controller 41, the PHC 42 through the bus B5 at step #604, and then, the program flow enters a process loop of steps #605 to #615.

Prior to the description of the process loop, the aforementioned two interruption processes will be described below.

Figure 21A:
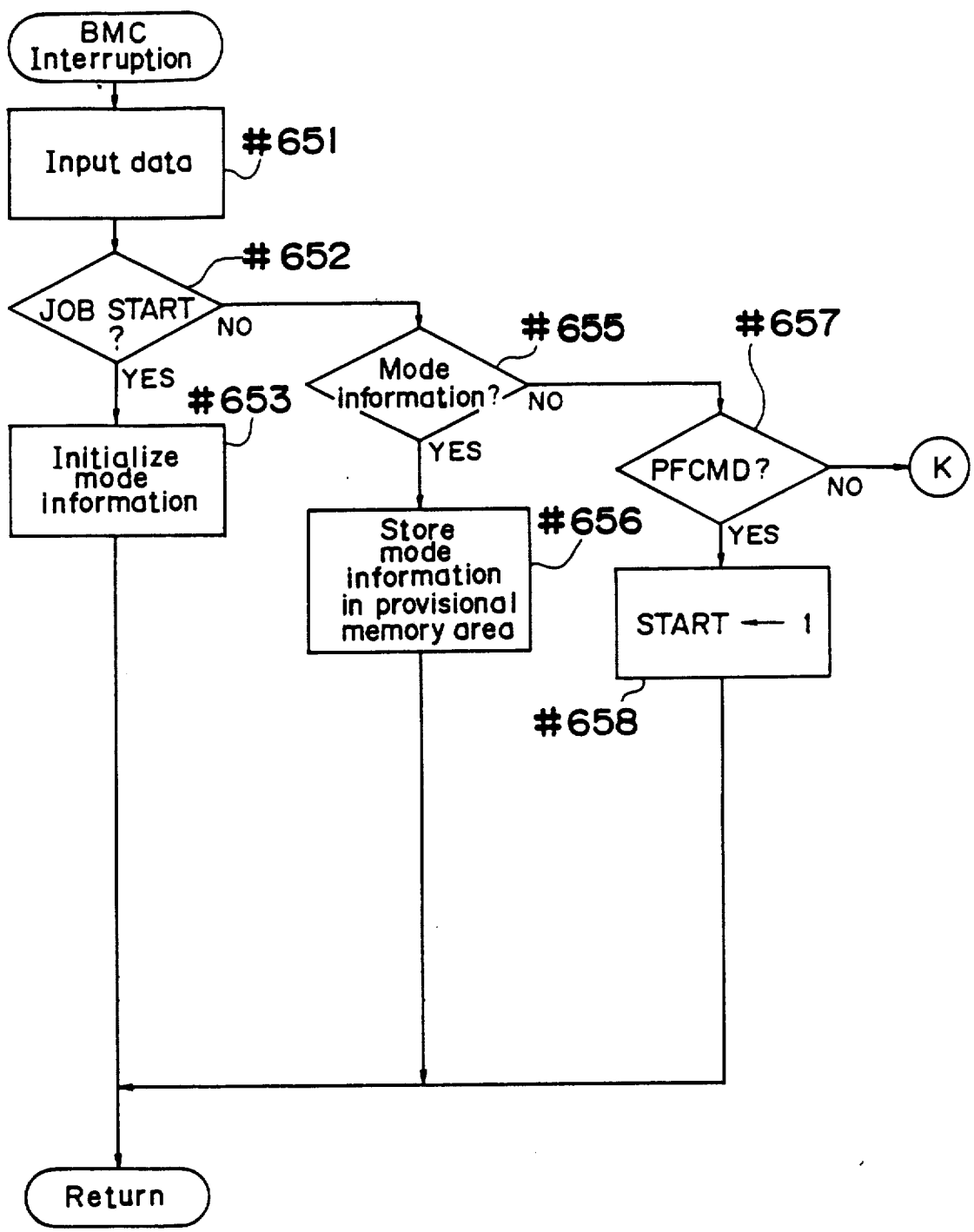
FIGS. 21a and 21b are flowcharts of a BMC interruption process executed by the interface controller shown in FIG. 4.
Figure 21B:
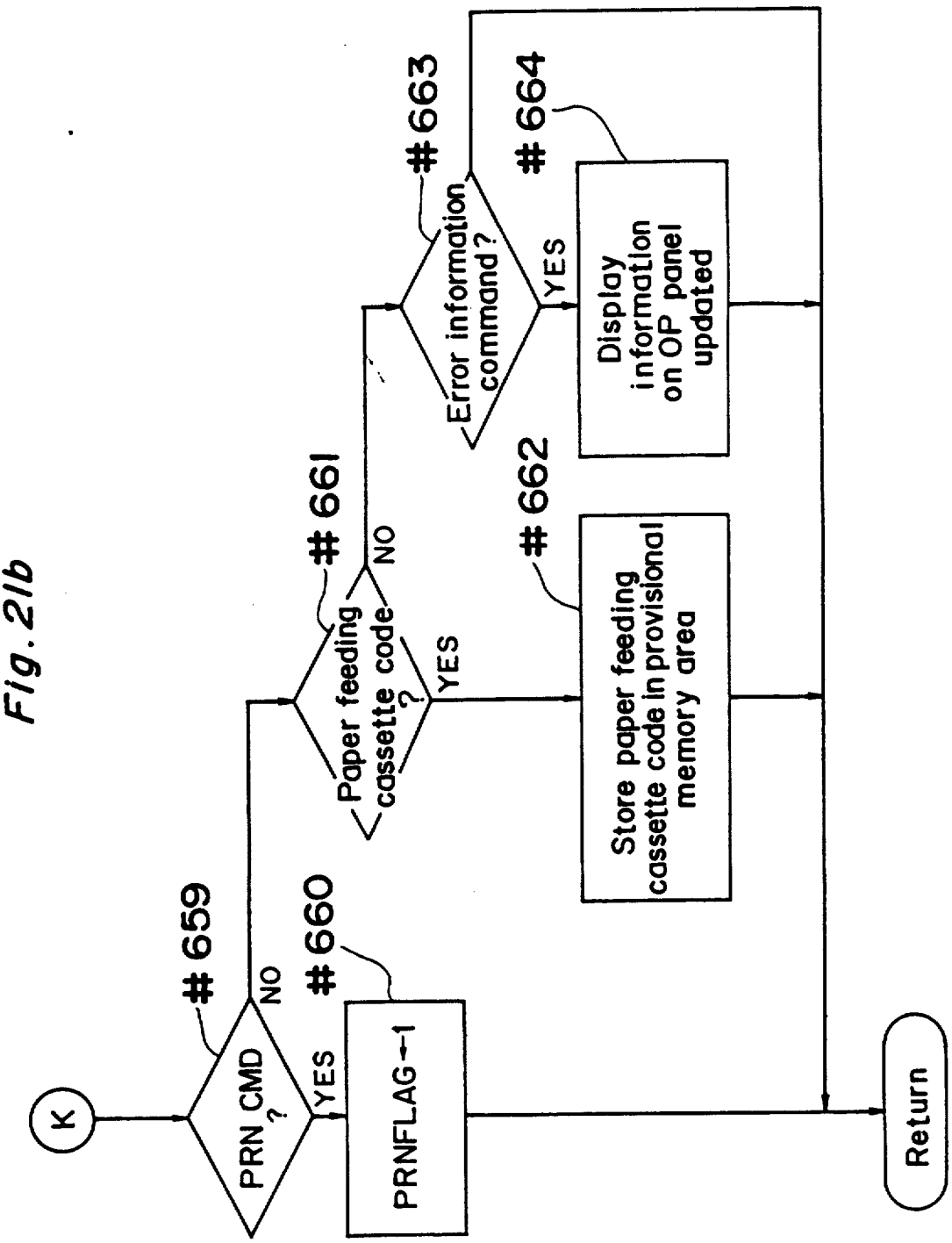

FIGS. 21a and 21b are flowcharts of the BMC interruption process.

In the BMC interruption process, there is executed a process when receiving commands sent from the BMC 30. Also, in the BMC interruption process, according to the received command, a process corresponding thereto is not executed directly, and only a flag within the IFC 40 is set. The actual process is executed after this flag is detected in this process loop, as described in detail later. Because the IFC 40 and the BMC 30 are constituted so that the communication between the IFC 40 for executing the process loop and the BMC 30 is performed in asynchronous with each other in order to simplify the composition of the process loop executed by the IFC 40.

Referring to FIG. 21a, in the BMC interruption process, first of all, a command sent from the BMC 30 is input to the second data processor 330 at step #651, and then, it is judged whether or not there is received either the JOB START command, mode information command, the PFCMD command, the PRNCMD command, a paper feeding cassette code, or an error information command at steps #652, #655, #657, #659, #661 and #663, respectively. If a command received from the BMC 30 is not one of those commands, the program flow returns.

The flags to be set actually in the BMC interruption process are a PRNFLAG flag to be set at step #660 when the PRNCMD command outputted upon starting the exposure is detected (Yes at step #657), and a START flag to be set at step #658 when the PFCMD command outputted upon feeding a sheet of copying paper is detected (Yes at step #659).

When the JOB START command is received (Yes at step #652), mode information is initialized at step #653, and then, the program flow returns.

When mode information such as print information, accessory information is received (Yes at step #655), the mode information is stored in a provisional memory area temporarily at step #656, and then, the program flow returns. This mode information stored in the provisional memory area is read out regularly within the process loop.

Further, when the paper feeding cassette code is received (Yes at step #661), this code is stored in a provisional memory area at step #662, and then, the program flow returns.

Furthermore, when the error information command is received (Yes at step #663), information displayed on the operation panel 44 is updated at step #664, and then, the program flow returns.

Figure 22B:
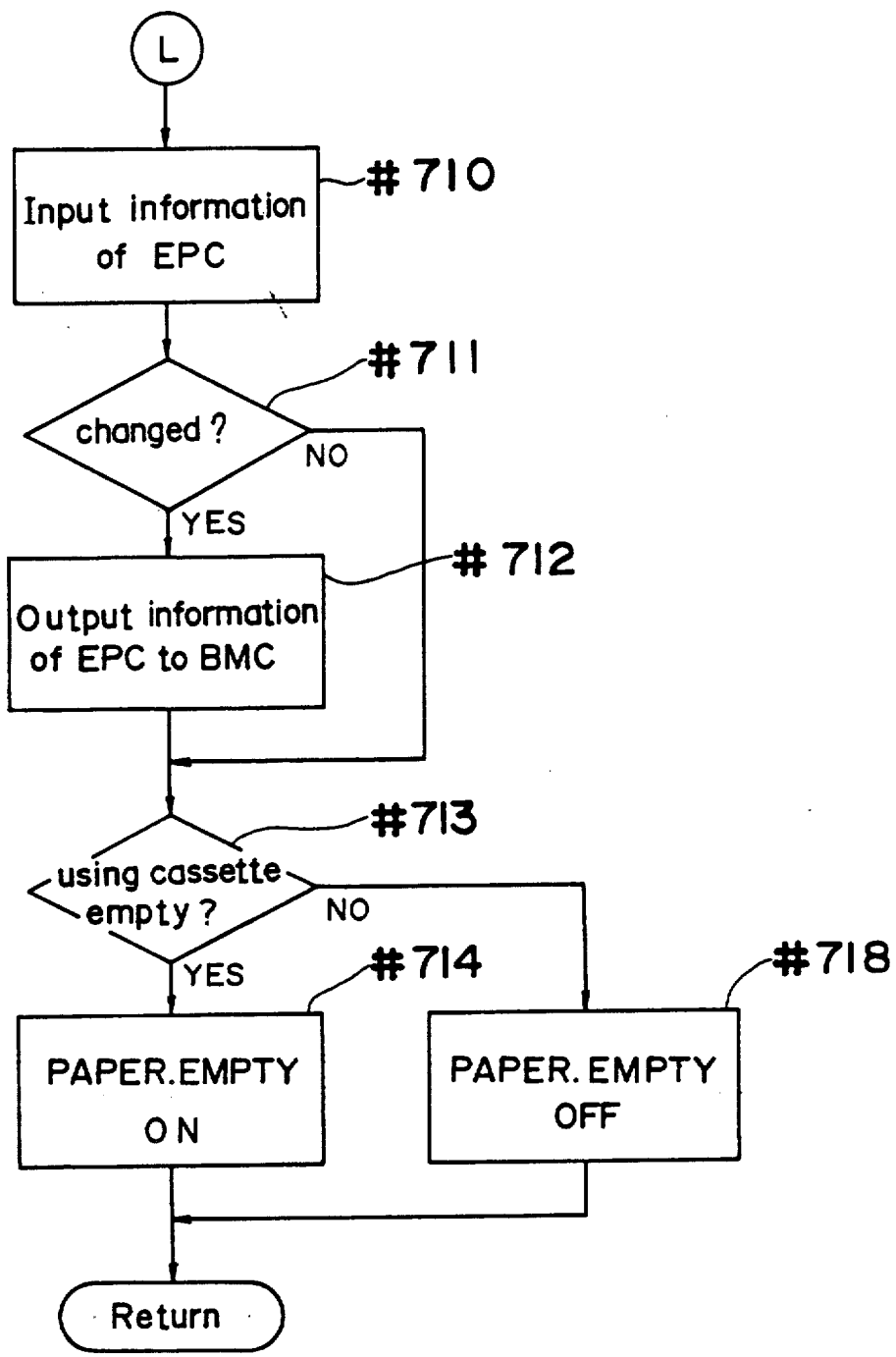

FIGS. 22a and 22b are flowcharts of the system timer interruption process.

Referring to FIG. 22a, a message for instructing an input operation is displayed on the operation panel 44 at step #701, and predetermined data are input using the operation panel 44 at step #702. Thereafter, a counting process of the timer set in the process loop is executed at step #703, and then, each state information of the external paper feeding unit 5, the sorter 6 and the electrophotographic process controller 41 is input to the second data processor 330 at steps #704, #707 and #710, respectively. After inputting each state information thereof, it is judged whether or not each input state information is different from each state information stored therein previously at steps #705, #708 and #711, respectively. If a change therebetween is caused (Yes at steps #705, #707 or #710), each changed state information is outputted to the BMC 30 at steps #706, #708 or #711, respectively. Otherwise, the program flow goes to the next step.

Thereafter, it is judged whether or not copying paper set in the using cassette is empty at step #713. If the copying paper is empty (Yes at step #713), the indicator 915 for indicating the paper empty state is turned on at step #714, and then, the program flow returns. Otherwise, the indicator 915 is turned off at step #718, and then, the program flow returns.

Finally, the process loop of the IFC 40 of the print engine 4 will be described below with reference to FIG. 20.

Referring to FIG. 20, the IFC 40 waits for the print start request command at step #605. After the print start request command is received and the START flag becomes "1" (Yes at step #605), the number of prints and the mode information of accessory units are updated at step #607. In the case of a multicopy operation, the START flag is reset to zero and the PRNSTAT flag is set at "1" so as to enable the print engine 4 to print an image on a sheet of copying paper at step #608. Thereafter, in order to perform a first printing operation, the IFC 40 outputs the paper feeding request signal FEED.-REQ to the electrophotographic process controller 41 through the bus B5 at step #609. Responsive to the signal FEED.REQ, the electrophotographic process controller 41 starts to drive the electrophotographic processor 45 so as to feed a sheet of copying paper and to print an image and/or characters thereon. Then, the copying paper is located at a predetermined position and is in a waiting state for printing. If the external paper feeding unit 5 is specified, the electrophotographic process controller 41 starts to drive only the electrophotographic processor 45, and the paper feeding operation is executed by the external paper feeding unit 5. In this case, the copying paper is located at the aforementioned waiting position.

Thereafter, the IFC 40 waits for the PRNCMD command at step #610. After the PRNCMD command is received and the PRNFLAG flag becomes "1" (Yes at step #610), the PRNFLAG flag is reset to zero at step #611, and then, the EXP.ENB signal for indicating the permission of the exposure is outputted to the PHC 42 at step #612. Then, the actual exposure operation is executed by the PHC 42.

After the exposure operation of the PHC 42 is completed, the PHC 42 outputs an EXP.END signal to the IFC 40. When the IFC 40 receives the EXP.END signal (Yes at step #613), the PRNSTAT flag is set at "0" and the JOBEND flag is set at "1" at step #614. Thereafter, the IFC 40 outputs the EXP.END signal to the BMC 32 at step #615, and then, the program flow goes back to step #605.

It is to be noted that, the IFC 40 controls the communication within the print engine 4 in addition to the aforementioned control, and has a relay function for the communication among respective controllers through the bus B5. Because the relay function of the IFC 40 is not subject matter of the present invention, the detail description thereof is omitted therein.

In the present preferred embodiment, as described above, there is provided the indicator 912 for indicating either the data receiving state, the data processing state, or the waiting state on the operation panel 44. However, there may be separately provided a first indicator for indicating the data receiving state, a second indicator for indicating the data processing state, and a third indicator for indicating the waiting state. Furthermore, only the first and second indicators may be provided.

In the present preferred embodiment, there is provided the indicator 912 of LED for indicating either the data receiving state, the data processing state, or the waiting state of the printer system 10, the present invention is not limited to this. As the indicator 912, various kinds of indicators or display lamps may be used.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A printer for printing data received from an external data processor, comprising:
    receipt means for receiving data sent from said external data processor;
    storage means for temporarily storing the data received by said receipt means;
    processing means for developing image data, responsive to the data stored in said storage means;
    print means for printing the image data developed by said processing means on printing paper;
    first detection means for detecting that said receipt means is in operation and for outputting a first detection signal when detecting it;
    second detection means for detecting that said process means is in operation and for outputting a second detection signal when detecting it;
    first display means for displaying that said receipt means is in operation, responsive to the first detection signal; and
    second display means for displaying that said processing means is in operation, responsive to the second detection signal.

2. The printer as claimed in claim 1 further comprising:
    means for inhibiting an operation of said second display means when the first detection signal is received.

3. The printer as claimed in claim 2,
    wherein said first and second display means are constituted by a common display lamp.

4. The printer as claimed in claim 3, further comprising:
    third display means for displaying that both said receipt means and said process means do not operate when not receiving both the first and second detection signals;
    wherein said first to third display means are constituted by a common display lamp.

5. The printer as claimed in claim 4, wherein said display lamp flickers when receiving the first detection signal, lights when receiving the second detection signal and not receiving the first detection signal, and lights out when not receiving both the first and second detection signals.

6. A printer for printing data received from an external data processor, comprising:
  receipt means for receiving data sent from said external data processor;
  storage means for temporarily storing the data received by said receipt means;
  processing means for developing image data, responsive to the data stored in said storage means;
  print means for printing the image data developed by said processing means on printing paper;
  first detection means for detecting that said receipt means is in operation and for outputting a first detection signal when detecting it;
  second detection means for detecting that said process means is in operation and for outputting a second detection signal when detecting it;
  display means for displaying the operation state of said printer; and
  drive means for driving said display means so as to display in a first display state responsive to the first detection signal, and driving said display means so as to display in a second display state different from the first display state responsive to the second detection signal.

7. The printer as claimed in claim 6, wherein said display means is constituted by a display lamp.

8. The printer as claimed in claim 7, wherein said drive means enables said display lamp to flicker in the first display state, enables said display lamp to light in the second display state, and enables said display lamp to light out in the other states.

9. The printer as claimed in claim 6, wherein said drive means drives said display means so as to display in the first display state continuously for a predetermined time after receiving the first detection signal.

10. The printer as claimed in claim 6, wherein said drive means drives said display means in the first display state which has priority over the second display state.

* * * * *